United States Patent
Hong et al.

(10) Patent No.: US 9,423,896 B2
(45) Date of Patent: Aug. 23, 2016

(54) METHOD FOR REPRESENTING A TACTILE IMAGE AND TOUCH SCREEN APPARATUS FOR PERFORMING THE METHOD

(71) Applicant: Samsung Display Co., LTD., Yongin, Gyeonggi-Do (KR)

(72) Inventors: Won-Ki Hong, Suwon-si (KR); Seung-Ho Nam, Seongnam-si (KR); Ji-Hong Park, Suwon-si (KR); Kang-Won Lee, Hwaseong-si (KR); Moon-Sung Choi, Incheon (KR)

(73) Assignee: SAMSUNG DISPLAY CO., LTD. (KR)

( * ) Notice: Subject to any disclaimer, the term of this patent is extended or adjusted under 35 U.S.C. 154(b) by 429 days.

(21) Appl. No.: 13/835,114

(22) Filed: Mar. 15, 2013

(65) Prior Publication Data

US 2014/0071067 A1    Mar. 13, 2014

(30) Foreign Application Priority Data

Sep. 12, 2012 (KR) .................. 10-2012-0100914

(51) Int. Cl.
| | | |
|---|---|---|
| G06F 3/041 | (2006.01) | |
| G06F 3/044 | (2006.01) | |
| G06F 3/01 | (2006.01) | |

(52) U.S. Cl.
CPC ............ *G06F 3/041* (2013.01); *G06F 3/016* (2013.01); *G06F 3/044* (2013.01); *G06F 3/0416* (2013.01); *G06F 3/0412* (2013.01)

(58) Field of Classification Search
CPC ......... G06F 3/016; G06F 3/041; G06F 3/044; G06F 3/0416; G06F 3/0412; G06F 3/047; G06F 3/03547
USPC ........................................................ 345/173
See application file for complete search history.

(56) References Cited

U.S. PATENT DOCUMENTS

| | | |
|---|---|---|
| 7,342,573 B2 | 3/2008 | Ryynanen |
| 7,579,758 B2 | 8/2009 | Maruyama et al. |
| 9,069,422 B2 * | 6/2015 | Chang ................. G06F 3/044 |
| 2010/0013791 A1 * | 1/2010 | Haga et al. ................. 345/174 |
| 2010/0156845 A1 | 6/2010 | Kim et al. |
| 2011/0310055 A1 | 12/2011 | An et al. |
| 2012/0062516 A1 * | 3/2012 | Chen et al. ................. 345/174 |
| 2012/0133622 A1 * | 5/2012 | Brokken et al. ............ 345/204 |
| 2012/0287068 A1 * | 11/2012 | Colgate et al. ............. 345/173 |

\* cited by examiner

*Primary Examiner* — Julie Anne Watko
(74) *Attorney, Agent, or Firm* — Cantor Colburn LLP

(57) ABSTRACT

A method for representing a tactile image and providing a touch function and a haptic feedback function to a tactile touch panel includes: applying a touch driving voltage to the tactile touch panel; and applying a tactile voltage corresponding to an image to be displayed to the tactile touch panel in a blanking interval when the touch driving voltage may be not applied to a plurality of touch driving lines of the tactile touch panel, when a touch sensing voltage corresponding to a touch on the tactile touch panel may be received through a plurality of touch sensing lines of the tactile touch panel.

17 Claims, 19 Drawing Sheets

METHOD FOR REPRESENTING A TACTILE IMAGE AND TOUCH SCREEN APPARATUS FOR PERFORMING THE METHOD

This application claims priority to Korean Patent Application No. 10-2012-0100914, filed on Sep. 12, 2012, and all the benefits accruing therefrom under 35 U.S.C. §119, the content of which in its entirety is herein incorporated by reference.

BACKGROUND

1. Field

Exemplary embodiments of the invention relate to a method for representing a tactile image and a touch screen apparatus for performing the method. More particularly, exemplary embodiments of the invention relate to a method for representing a tactile image on a touch screen panel of a capacitance type to realize a haptic feedback function and a touch screen apparatus for performing the method.

2. Description of the Related Art

Humans interface with electronic and mechanical devices in a variety of applications, which may be improved with a more natural, easy-to-use and informative interface. Specifically, humans interface with computer devices for a variety of applications. One such application may be interacting with computer-generated environments such as games, simulations and application programs. Computer input devices such as mice and trackballs may be used to control a cursor within a graphical environment and provide input in such applications.

In some interface devices, force feedback or tactile feedback is also provided to the user, collectively known herein as "haptic feedback." For example, haptic versions of joysticks, mice, gamepads, steering wheels or other types of devices may output forces to the user based on events or interactions occurring within the graphical environment, such as in a game or other application program.

In portable electronic devices such as laptop computers, compact devices such as trackballs may be used instead of mice. In the portable electronic devices, "touchpads," which are small rectangular, planar pads provided near the keyboard of the computer, are widely used. The touchpad senses the location of a pointing object by any of a variety of sensing technologies, such as capacitive sensors or pressure sensors that detect pressure applied to the touchpad. The user contacts the touchpad typically with a fingertip and moves his or her finger on the pad to move a cursor displayed in the graphical environment.

A touchscreen is typically used for inputting information via a sensing pad that is covered on a display screen, widely used in a device such as personal digital assistant ("PDA"), and other mobile electronic devices.

A tactile panel may be disposed on a touch screen panel of a capacitance type to provide a haptic feedback function, and the touch screen panel and the tactile panel may be separately provided.

SUMMARY

Exemplary embodiments of the invention provide a method for representing a tactile image which prevents an electric field generated by a tactile image from being blocked when a touch operation is performed through a touch screen panel of a capacitance type.

Exemplary embodiments of the invention also provide a touch screen apparatus for performing the above-mentioned method.

According to an exemplary embodiment of the invention, a method for representing a tactile image and providing a touch function and a haptic feedback function to a tactile touch panel includes: applying a touch driving voltage to the tactile touch panel; and applying a tactile voltage corresponding to an image to be displayed to the tactile touch panel in a blanking interval when the touch driving voltage may be not applied to a plurality of touch driving lines of the tactile touch panel, when a touch sensing voltage corresponding to a touch on the tactile touch panel may be received through a plurality of touch sensing lines of the tactile touch panel.

In an exemplary embodiment, a phase of the tactile voltage may be inverted every frame interval of the image is displayed on the display panel.

In an exemplary embodiment, the tactile voltage may be applied to the tactile touch panel in a vertical blanking interval, during which a scan signal for activating a switching element of a display panel for displaying the image is not applied to the display panel.

In an exemplary embodiment, the vertical blanking interval may include a touch interval and a tactile interval. In such an embodiment, the tactile voltage may be applied to the tactile touch panel in the tactile interval.

In an exemplary embodiment, the tactile voltage applied in the tactile interval of the vertical blanking interval may have a phase different from a phase of the tactile voltage applied in the tactile interval of an adjacent vertical blanking interval.

In an exemplary embodiment, a touch frame interval, during which the touch driving voltage is applied may include a first tactile frame interval and a second tactile frame interval, and a phase of the tactile voltage applied to the tactile touch panel in the first tactile frame interval and a phase of the tactile voltage applied to the tactile touch panel in the second tactile frame interval may be different from each other.

In an exemplary embodiment, two touch frame intervals, in which the touch driving voltage may be applied to the touch driving lines, corresponds to a tactile frame interval, the tactile voltage may be applied to the tactile touch panel before the touch driving voltage is applied to the touch driving lines in a first touch frame interval, and the tactile voltage may be applied to the tactile touch panel after the touch driving voltage is applied to the touch driving lines in a first touch frame interval.

In an exemplary embodiment, the tactile voltage is applied to the tactile touch panel in a (4N-3)-th touch frame interval and in a (4N-1)-th touch frame interval, and a phase of the tactile voltage applied to the tactile touch panel in the (4N-3)-th touch frame interval and a phase of the tactile voltage applied to the tactile touch panel in the (4N-1)-th touch frame interval may be different from each other, where N is a natural number.

In an exemplary embodiment, a vertical blanking interval of the image may include a touch interval and a tactile interval. In such an embodiment, the touch driving voltage may be applied to the touch driving lines in the touch interval, and the tactile voltage may be applied to the tactile touch panel in the tactile interval.

In an exemplary embodiment, a vertical blanking interval of the image may include a touch interval and a tactile interval, and the tactile interval may include a first tactile frame interval and a second tactile interval. In such an embodiment, the touch driving voltage may be applied to the touch driving lines in the touch interval, the first tactile voltage may be applied to the tactile touch panel in the first tactile frame interval, and the second tactile voltage having a phase opposite to the first tactile voltage may be applied to the tactile touch panel in the second tactile frame interval.

According to another exemplary embodiment of the invention, a touch screen apparatus includes a tactile touch panel including a plurality of touch driving lines and a plurality of touch sensing lines, where the tactile touch panel performs a touch function and a haptic feedback function, a touch voltage applying part which applies a touch driving voltage to the tactile touch panel, and a tactile voltage applying part which applies a tactile voltage corresponding to an image displayed thereon to the tactile touch panel in a blanking interval, during which the touch driving voltage may be not applied, when a touch sensing voltage corresponding to a touch thereon may be received through the touch sensing lines.

In an exemplary embodiment, the touch driving lines and the touch sensing lines may be disposed on a same substrate. In such an embodiment, the touch driving lines and the touch sensing lines may extend crossing each other. The tactile touch panel may further include an insulation layer disposed on an area, where the touch driving lines and the touch sensing lines overlap each other, and the insulation layer electrically isolates the touch driving lines and the touch sensing lines. In such an embodiment, the touch driving lines and the touch sensing lines may be substantially parallel to each other. In such an embodiment, the tactile voltage applying part may apply the tactile voltage to the touch driving lines and the touch sensing lines.

In an exemplary embodiment, the touch driving lines and the touch sensing lines may be disposed on different substrates, respectively. In such an embodiment, the tactile voltage applying part may apply the tactile voltage to the touch sensing lines.

In an exemplary embodiment, a phase of the tactile voltage applied to the tactile display panel may be inverted every frame interval of the image displayed thereon.

In an exemplary embodiment, the tactile voltage may be applied to a portion of the tactile touch panel corresponding to a position of the touch detected through the touch sensing line.

In an exemplary embodiment, the touch screen apparatus may further include a display panel disposed below the tactile touch panel and a shielding layer disposed between the tactile touch panel and the display panel and which blocks the tactile voltage from being applied to the display panel.

In an exemplary embodiment, the touch screen apparatus may further include a scan driving part which outputs a scan signal activating a switching element disposed on the display panel, where the tactile voltage applying part may apply the tactile voltage to the touch driving lines and the touch sensing lines in a vertical blanking interval, during which the scan signal is not applied to the display panel.

In an exemplary embodiment, the blanking interval may be in a vertical blanking interval of the image.

In an exemplary embodiment, the touch voltage applying part may apply a single touch driving voltage to the tactile touch panel in a vertical blanking interval of the image, and the tactile voltage applying part may apply a single tactile voltage to the tactile touch panel in the vertical blanking interval of the image.

In an exemplary embodiment, a touch frame interval, in which the touch driving voltage may be applied to the touch driving lines, may include a first tactile frame interval and a second tactile frame interval. In such an embodiment, the tactile voltage applying part may apply a first tactile voltage to the tactile touch panel in the first tactile frame interval, and may apply a second tactile voltage having a phase opposite to the first tactile voltage to the tactile touch panel in the second tactile frame interval.

In an exemplary embodiment, the touch driving voltage may be applied to the touch driving lines in a touch frame interval, and two touch frame intervals may define a touch frame interval. In such an embodiment, the tactile voltage applying part may apply the tactile voltage to the tactile touch panel before the touch driving voltage is applied to the touch driving lines in a first touch frame interval, and may apply the tactile voltage to the tactile touch panel after the touch driving voltage is applied to the touch driving lines in the second touch frame interval.

In an exemplary embodiment, the touch driving voltage may be applied to the touch driving lines in a touch frame interval, and the tactile voltage applying part may apply a first tactile voltage to the tactile touch panel in a (4N-3)-th touch frame interval, and may apply a second tactile voltage having a phase opposite to the first tactile voltage to the tactile touch panel in (4N-1)-th touch frame interval, where 'N' is a natural number.

In an exemplary embodiment, a vertical blanking interval of the image may include a touch interval and a tactile interval. In such an embodiment, the touch voltage applying part may apply the touch driving voltage to the tactile touch panel in a touch interval, and may apply the tactile voltage to the tactile touch panel in the tactile interval.

In an exemplary embodiment, a vertical blanking interval of the image may include a touch interval and a tactile interval, and the tactile interval may include a first tactile frame interval and a second tactile interval. In such an embodiment, the touch voltage applying part may apply the touch driving voltage to the tactile touch panel in the touch interval, and the tactile voltage applying part may apply a first tactile voltage to the tactile touch panel in the first tactile frame interval, and may apply a second tactile voltage having a phase opposite to the first tactile voltage to the tactile touch panel in the second tactile frame interval.

According to a method for representing a tactile image and a touch screen apparatus for performing the method, a tactile voltage corresponding to a displayed image to a tactile touch panel is applied to perform a haptic feedback function on a touch screen apparatus of a capacitance type in a blanking interval during which a touch driving voltage is not applied to the tactile touch panel, such that a touch operation is effectively prevented from being blocked by an electric field generated by a tactile image.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
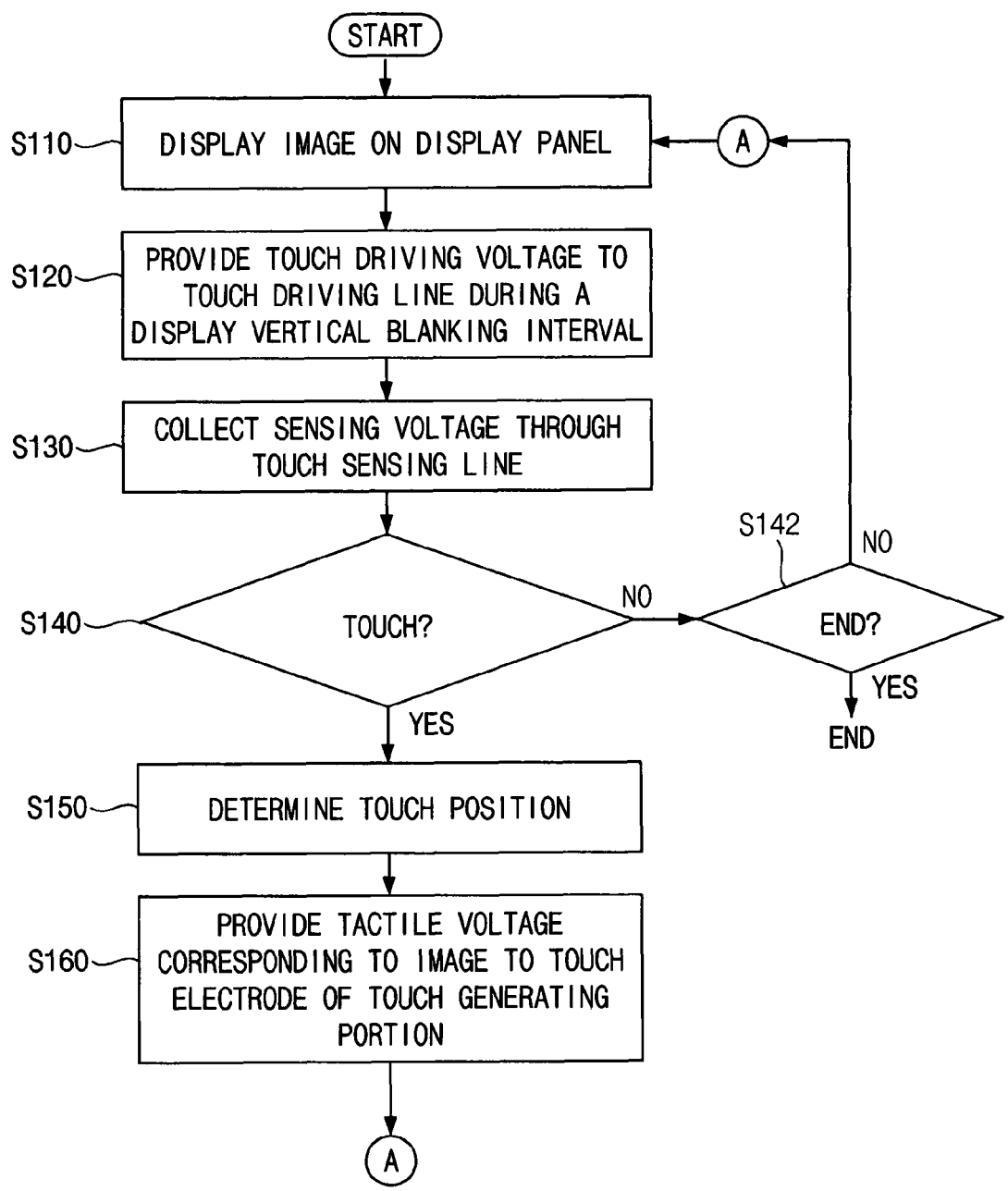
FIG. 1 is a flow chart showing an exemplary embodiment of a tactile image representing method according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A technical term "viewing angle" is defined as the angle between the line of sight of the viewer viewing the screen and the tangent to the intersection between the line of sight and the observed screen surface, and the difference between the center and left/right edge viewing angles is defined as and used to mean the "viewing angle difference.

Hereinafter, exemplary embodiments of a method for representing a tactile image and exemplary embodiments of a touch screen apparatus for performing the method in accordance with the invention will be described in detail with reference to the accompanying drawings.

FIG. 1 is a flow chart showing an exemplary embodiment of a tactile image representing method according to the invention.

Referring to FIG. 1, an image is displayed on a display panel (step S110). The image displayed on the display panel may have various textures. In one exemplary embodiment, for example, the image may be an image of uneven texture such as a skin of tree or a surface of rock. In such an embodiment, for example, the image may be an image of metal texture or an image of fabric texture.

In a display vertical blanking interval, during which the image is not display on the display panel, a touch driving voltage is provided to a touch driving line disposed on a tactile touch panel disposed on the display panel (step S120), and a touch sensing voltage is received through a touch sensing line disposed on the tactile touch panel (step S130). In an exemplary embodiment, the touch driving line and the touch sensing line may be disposed on a same substrate. In an alternative exemplary embodiment, the touch driving line and the touch sensing line may be respectively disposed on different substrates. In such an embodiment, where the touch driving line and the touch sensing line are disposed on substrates different from each other, a substrate having the touch sensing line thereon is disposed on a substrate having the touch driving line thereon.

When a touch driving voltage (e.g., a driving voltage or a driving current) is applied to the touch driving lines, a capacitor is formed at a peripheral portion of the touch sensing line adjacent to a corresponding touch driving line. When a touch means, such as a finger or a touch pen of a user, for example, is approached to the capacitor, charges are flowed from the capacitor such that strength of an electric field is varied. A touch sensing voltage is collected based on a varying amount of the electric field through the touch sensing line.

Then, it is determined whether a touch occurs or not (step S140). In one exemplary embodiment, for example, when the collected touch sensing voltage is greater than or equal to a reference voltage, it may be determined that the touch occurs at a corresponding portion.

When it is determined that the touch is not generated in step S140, it is determined whether a tactile image representing method is ended or not (step S142). The tactile image representing method is ended when the tactile image representing method is ended in step S142, and it is fed back to step S110 when the tactile image representing method is not ended.

In step S140, when it is determined that a touch occurs, a touch position is determined based on the collected sensing voltage (step S150).

Then, a tactile voltage corresponding to a displayed image is provided to a touch electrode of a touch generating portion (step S160), and then it is feedback to step S110. The tactile voltage may be applied thereto in a pulse type having various widths and various amplitudes. In one exemplary embodiment, for example, a tactile voltage of great amplitude may be applied to the touch electrode when an amount of an uneven texture is great, and a tactile voltage of small amplitude may be applied to the touch electrode when an amount of an uneven texture is small. In such an embodiment, the tactile voltage may be applied to the touch electrode in various timings. In one exemplary embodiment, for example, in a tactile interval different from a touch interval when the touch driving voltage is applied to the touch electrode, the tactile voltage may be applied thereto in a same timing or in the different timings. In such an embodiment, in a touch interval when the touch diving voltage is applied to the touch electrode, the tactile voltage may be applied to the touch electrode in the different timing when the touch driving voltage is not applied to the touch electrode. In an exemplary embodiment, the tactile voltage may be applied to the touch electrode in a sequential timing. The sequential timing will be described in greater detail with reference to the accompanying drawings.

As described above, in an exemplary embodiment, in a blanking interval when a touch driving voltage is not applied, a tactile voltage corresponding to an image is applied to a tactile touch panel, such that a touch operation is effectively prevented from being blocked by an electric field generated by a tactile image.

Hereinafter, exemplary embodiments of the touch screen apparatus for performing the tactile image representing method will be described.

Figure 2:
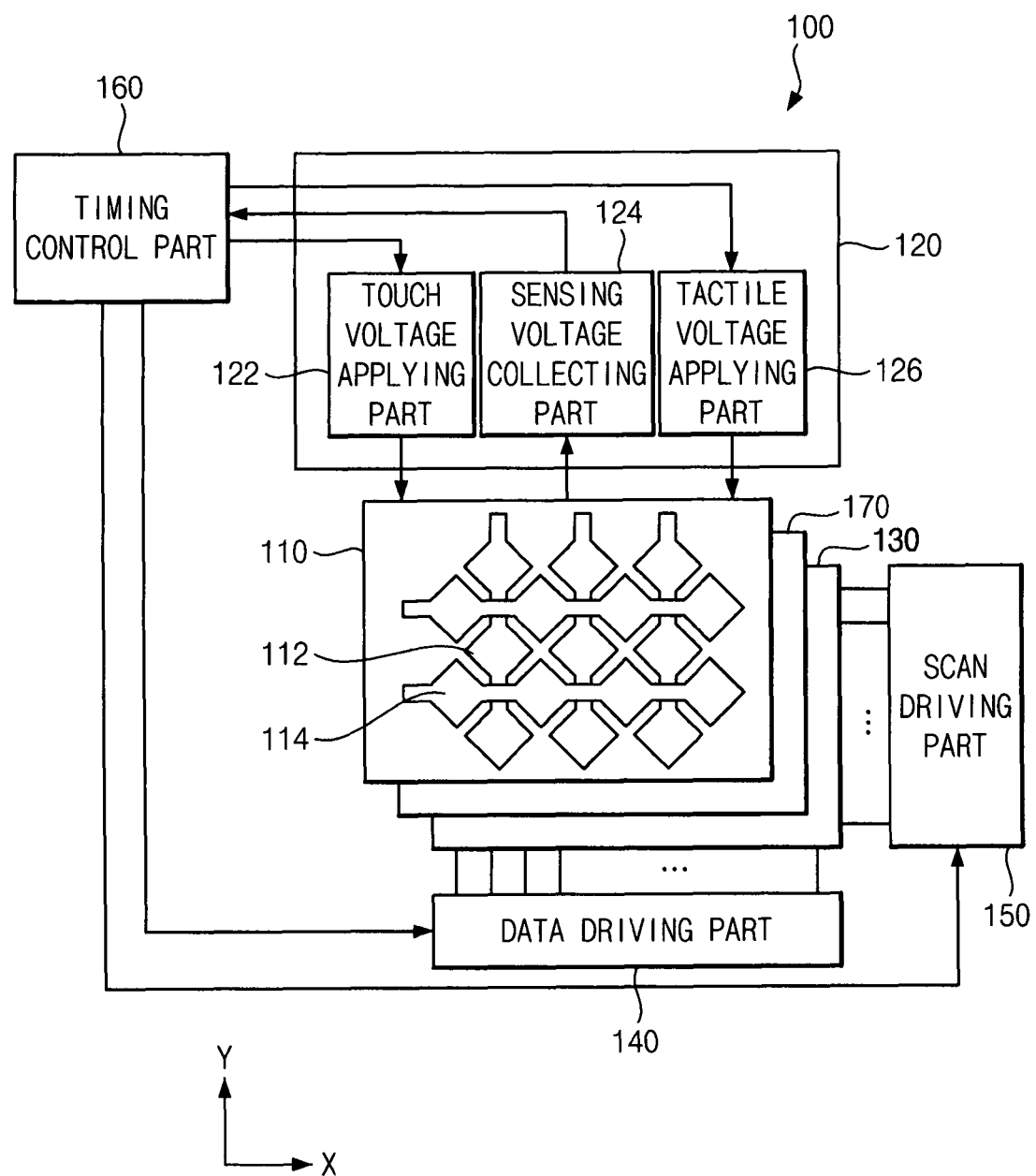
FIG. 2 is a block diagram showing an exemplary embodiment of a touch screen apparatus according to the invention.

FIG. 2 is a block diagram showing an exemplary embodiment of a touch screen apparatus according to the invention.

Referring to FIG. 2, an exemplary embodiment of a touch screen apparatus 100 according the invention includes a tactile touch panel 110, a voltage transmitting/receiving part 120, a display panel 130, a data driving part 140, a scan driving part 150 and a timing control part 160.

The tactile touch panel 110 includes a plurality of touch driving lines 112 and a plurality of touch sensing lines 114, where the touch driving lines 112 and the touch sensing lines 114 perform a touch function and a haptic feedback function. The touch driving lines 112 may extend substantially parallel to a Y-axis and may be arranged in an X-axis. The touch sensing lines 114 may extend substantially parallel to an X-axis and may be arranged in a Y-axis.

In an exemplary embodiment, the touch driving lines 112 has a structure that indium tin oxide ("ITO") patterns of a rectangular shape are connected to each other in a chain shape. In such an embodiment, the touch sensing lines 114 has a structure that ITO patterns of a rectangular shape are connected to each other in a chain shape. Thus, when viewed on an XY-plane, the tactile touch panel 110 may have a matrix shape. In an exemplary embodiment, as shown in FIG. 2, the touch driving lines 112 and the touch sensing lines 114 are disposed crossing each other, and an insulation layer (not shown) is further disposed on a crossing area of the touch driving lines 112 and the touch sensing lines 114.

The voltage transmitting/receiving part 120 includes a touch voltage applying part 122, a sensing voltage collecting part 124 and a tactile voltage applying part 126, each of which are connected to the tactile touch panel 110 and the timing control part 160.

The touch voltage applying part 122 is connected to the touch driving lines 112 and applies a touch driving voltage to the touch driving lines 112.

The touch sensing voltage collecting part 122 is connected to the touch sensing lines 114 and receives a touch sensing voltage. The touch sensing voltage collecting part 122 provides the timing control part 160 with the received touch sensing voltage.

The tactile voltage applying part 126 is connected to the touch driving lines 112 and the touch sensing lines 114. In a blanking interval when the touch driving voltage is not applied to the touch driving lines 112, the tactile voltage applying part 126 applies a tactile voltage corresponding to an image displayed on the display panel 130 to the touch driving lines 112 and the touch sensing lines 114. In an exemplary embodiment, the blanking interval may be in a vertical blanking interval of an image. In an exemplary embodiment, the tactile voltage is greater than a touch driving voltage. In one exemplary embodiment, for example, when an image displayed on the display panel 130 is an image having an uneven texture, the tactile voltage applying part 126 provides the touch driving lines 112 and the touch sensing lines 114 with a tactile voltage having a first level. The tactile voltage may be applied in an alternating manner to increase a haptic feedback effect. In one exemplary embodiment, for example, a first tactile voltage having a first phase may be applied to the touch driving lines 112 and the touch sensing lines 114 in a first blanking interval, and a second tactile voltage having a second phase opposite to the first phase may be applied to the touch driving lines 112 and the touch sensing lines 114 in a second blanking interval.

The tactile voltage applying part 126 and the touch voltage applying part 122 are operated at different times. The tactile voltage applying part 126 and the touch voltage applying part 122 may be operated based on a control of the timing control part 160.

The display panel 130 is disposed below the tactile touch panel 110. The display panel 130 may be a liquid crystal display panel, a plasma display panel or an organic light-emitting display panel, for example. In an exemplary embodiment, where the display panel 130 is a liquid crystal display panel, the display panel 130 may include a plurality of pixel electrodes (not shown) for displaying an image, a plurality of switching elements (not shown) for activating the pixel electrodes. In such an embodiment, the switching elements may include a thin-film transistor ("TFT").

The data driving part 140 provides a data signal to a pixel electrode disposed on the display panel 130. In one exemplary embodiment, For example, when the display panel 130 includes a switching element, the data driving part 140 provides the pixel electrode with a data signal via the switching element.

The scan driving part 150 outputs a scan signal for activating the switching element disposed on the display panel 130. When the scan signal is applied to the switching element, the switching element is turned on to deliver the data signal to the pixel electrode. In such an embodiment, the tactile voltage applying part 126 applies a tactile voltage to each of the touch driving lines 112 and the touch sensing lines 114, in a vertical blanking interval, during which the scan signal is not applied to the display panel 130.

The timing control part 160 provides the data driving part 140 with an image data for displaying an image on the display panel 130 and a first control signal corresponding to the image data, and provides the scan driving part 160 with a second control signal for activating a switching element disposed on the display panel 130. In such an embodiment, the timing control part 160 provides the touch voltage applying part 122 with a third control signal for performing a touch function, and receives a touch sensing voltage provided from the sensing voltage collecting part 130. In such an embodiment, the timing control part 160 provides the tactile voltage applying part 124 with a fourth control signal for performing a haptic feedback function.

In an exemplary embodiment, as shown in FIG. 2, the touch screen apparatus 100 may further include a shielding layer 170. The shielding layer 170 is disposed between the tactile touch panel 110 and the display pane 130 and effectively prevents the tactile voltage outputted from the tactile voltage applying part 126 from being applied to the display panel 130.

In an alternative exemplary embodiment, the shielding layer 170 may disposed within the display panel 130. In an exemplary embodiment, where the display panel 130 is a liquid crystal display panel including an array substrate, an opposite substrate opposite to the array substrate and a liquid crystal layer interposed between the array substrate and the opposite substrate, the shielding layer 170 may be disposed on the opposite substrate. In an alternative exemplary embodiment, the shielding layer 170 may be disposed on the array substrate.

Hereinafter, timings of various exemplary embodiments of the touch driving voltage and a tactile voltage applied to the tactile touch panel 110 described in FIG. 2 will be described. In the following signal timing diagrams, D1, D2, D3, ..., Dn denote touch driving lines, and S1, S2, S3, ..., Sn denote touch sensing lines, where 'n' is a natural number.

Figure 3:
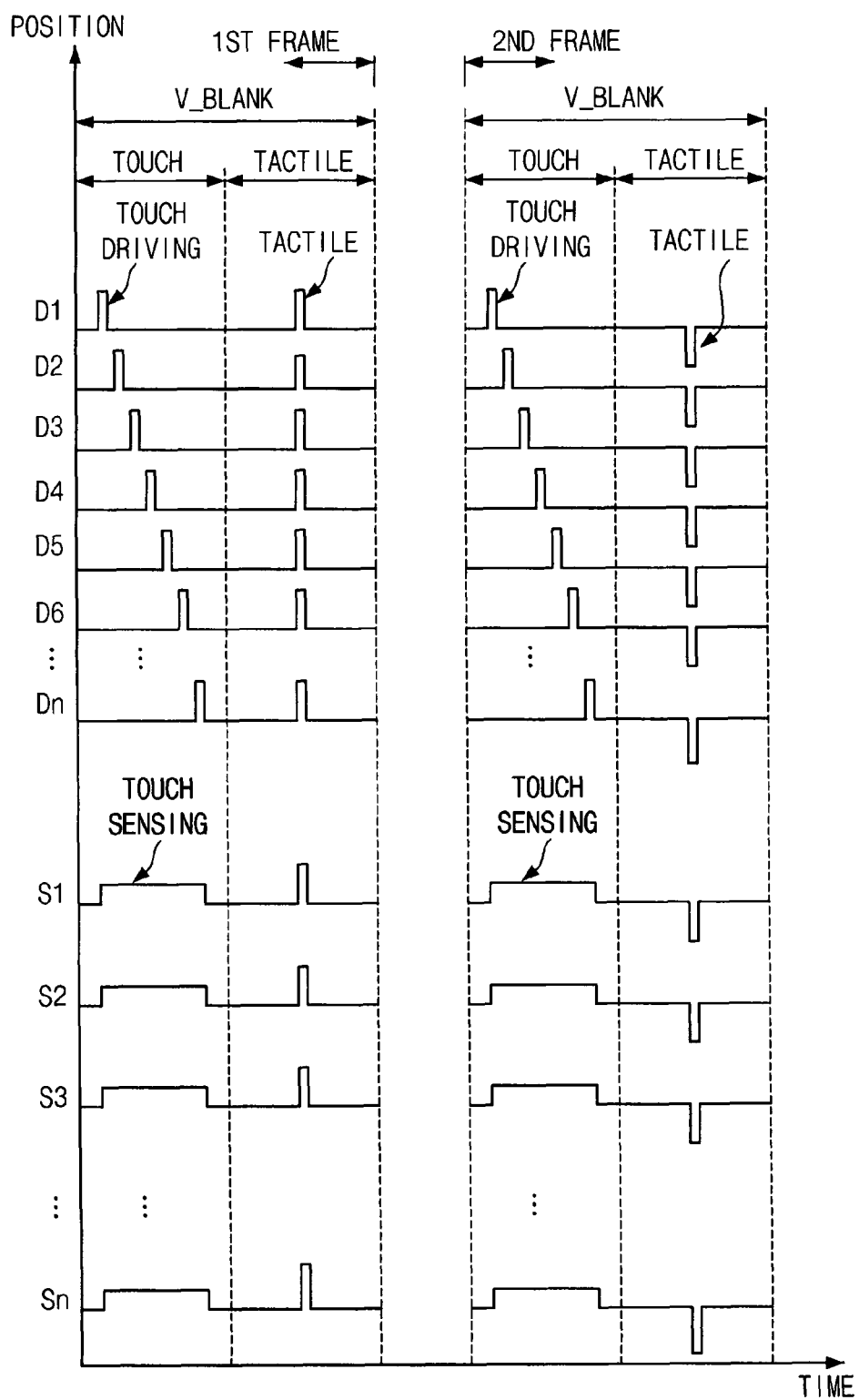
FIG. 3 is a signal timing diagram showing a transmitting/receiving timing of an exemplary embodiment of a touch driving voltage, a touch sensing voltage and a tactile voltage in the touch screen apparatus described in FIG. 2.

FIG. 3 is a signal timing diagram showing a transmitting/receiving timing of an exemplary embodiment of a touch driving voltage, a touch sensing voltage and a tactile voltage in the touch screen apparatus described in FIG. 2.

Referring to FIGS. 2 and 3, each of frames, e.g., a first frame and a second frame includes a vertical blanking interval (V_BLANK), during which an image is not displayed on a display panel, and the vertical blanking interval includes a touch interval (TOUCH) and a tactile interval (TACTILE).

In the touch interval, a touch driving voltage is outputted from the touch voltage applying part 122 and sequentially applied to each of the touch driving lines D1, D2, D3, ..., Dn and a touch sensing voltages corresponding to the touch sensing lines S1, S2, S3, ..., Sn are collected by the sensing voltage collecting part 124.

In the tactile interval, a timing when a tactile voltage is applied to the touch driving lines D1, D2, D3, ..., Dn is substantially the same as a timing when a tactile voltage is applied to the touch sensing lines S1, S2, S3, ..., Sn. In an exemplary embodiment, the tactile voltage is applied to the touch driving lines D1, D2, D3, ..., Dn and the touch sensing lines S1, S2, S3, ..., Sn during a predetermined time within the tactile interval. In one exemplary embodiment, for example, an applying time of a tactile voltage applied to a first touch driving line is substantially the same as an applying time of a tactile voltage applied to a second touch driving line. In such an embodiment, an applying time of a tactile voltage applied to a first touch sensing line is substantially the same as an applying time of a tactile voltage applied to a second touch sensing line.

A phase of the tactile voltage is inversed every frame. In one exemplary embodiment, for example, in a tactile interval corresponding to a first vertical blanking interval, a first tactile voltage is applied to the touch driving lines D1, D2, D3, ..., Dn and the touch sensing lines S1, S2, S3, ..., Sn. In a tactile interval corresponding to a second vertical blanking interval, a second tactile voltage having a phase opposite to the first tactile voltage is applied to the touch driving lines D1, D2, D3, ..., Dn and the touch sensing lines S1, S2, S3, ..., Sn. Thus, a phase of a tactile voltage is inversed every frame, such that a haptic feedback effect (e.g., a vibration effect) is substantially increased.

In an exemplary embodiment, as shown in FIG. 3, a tactile voltage is simultaneously applied to all of touch driving lines D1, D2, D3, ..., Dn and all of touch sensing lines S1, S2, S3, ..., Sn. In an alternative exemplary embodiment, the tactile voltage may be applied based on an area where a touch occurs.

In one exemplary embodiment, for example, when the sensing voltage collecting part 124 collects the touch sensing voltage, the timing control part 160 may determine that a touch occurs at a position. In such an embodiment, the timing control part 160 provides the tactile voltage applying part 126 with information of the touch. The tactile voltage applying part 126 applies a tactile voltage to a touch driving line in a portion corresponding to the position of the touch and a touch sensing line in the portion corresponding to the position of the touch. In such an embodiment, the number of the touch driving lines in the portion corresponding to the position of the touch may be greater than two. In such an embodiment, the number of the touch sensing lines in the portion corresponding to the position of the touch may be greater than two.

As described above, in an exemplary embodiment, a touch driving voltage is applied to the touch driving lines and a touch sensing voltage is collected during a touch interval of a vertical blanking interval, during which an image is not displayed on the display panel, and a tactile voltage is simultaneously applied to the touch driving lines and the touch sensing lines in a tactile interval, such that a haptic feedback function may be performed in an image displayed on a display panel.

Figure 4:
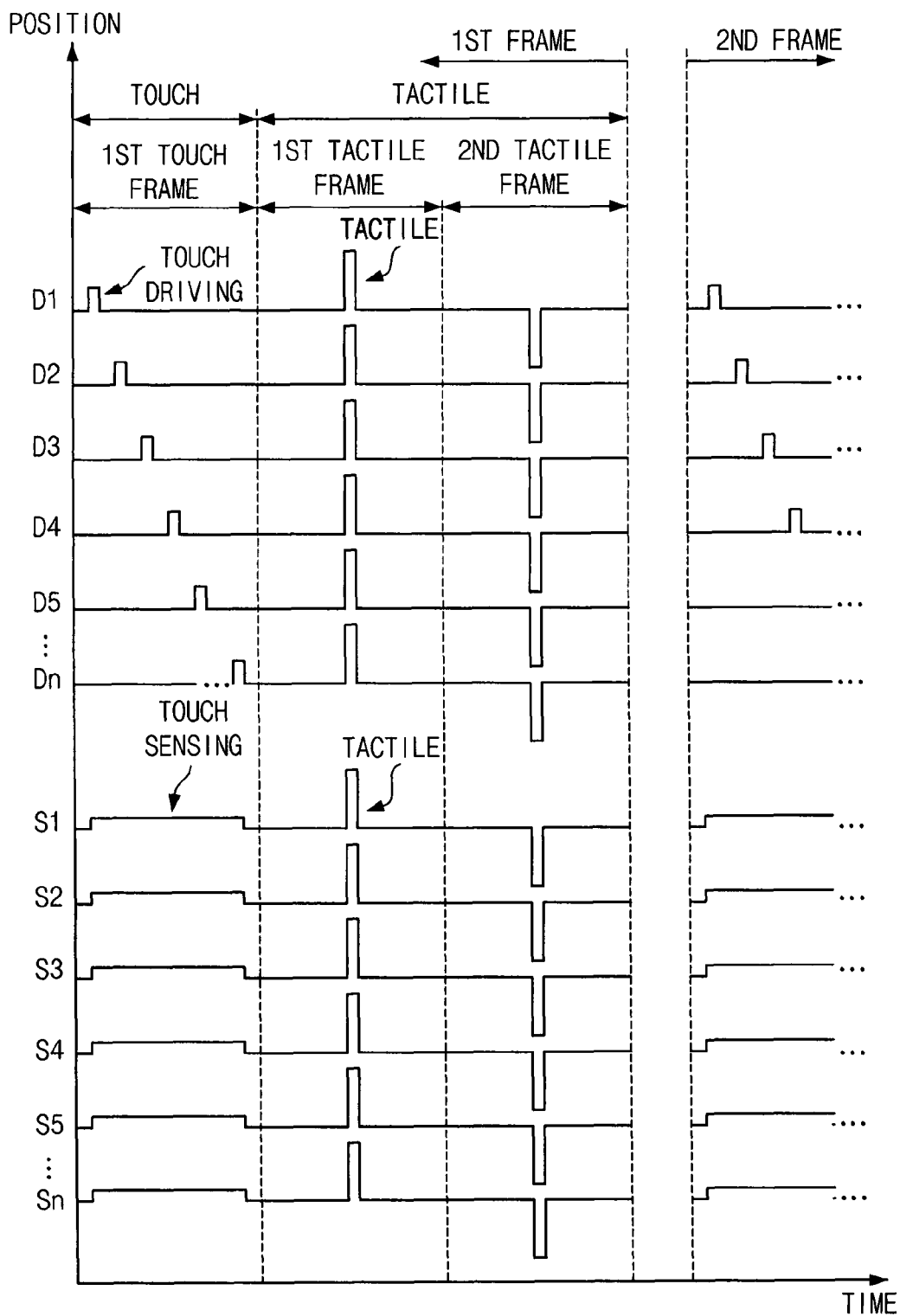
FIG. 4 is a signal timing diagram showing a transmitting/receiving timing of an alternative exemplary embodiment of a touch driving voltage, a touch sensing voltage and a tactile voltage in the touch screen apparatus described in FIG. 2.

FIG. 4 is a signal timing diagram showing a transmitting/receiving timing of an alternative exemplary embodiment of a touch driving voltage, a touch sensing voltage and a tactile voltage in the touch screen apparatus described in FIG. 2. In FIG. 4, amplitudes of tactile voltages applied to the touch driving lines D1, D2, D3, ..., Dn are greater than amplitudes of touch driving voltages applied to the touch driving lines D1, D2, D3, ..., Dn. In FIG. 4, amplitudes of touch sensing voltages applied to the touch sensing lines S1, S2, S3, ..., Sn are less than amplitudes of tactile voltages applied to the touch sensing lines S1, S2, S3, ..., Sn.

Referring to FIGS. 2 and 4, a vertical blanking interval, during which an image is not displayed on a display panel, includes a touch interval and a tactile interval. The tactile interval includes a first tactile frame interval and a second tactile frame interval.

In the touch interval, a touch driving voltage is outputted from the touch voltage applying part 122 and sequentially applied to the touch driving lines D1, D2, D3, ..., Dn, respectively, and touch sensing voltage of the touch sensing lines S1, S2, S3, ..., Sn are collected by the sensing voltage collecting part 124. In an exemplary embodiment, the sensing voltage collecting part 124 applies a voltage of a predetermined level to the touch sensing lines S1, S2, S3, ..., Sn during a time when all of the touch driving voltages are applied to the touch driving lines D1, D2, D3, ..., Dn to collect the touch sensing voltage. In one exemplary embodiment, for example, when a first sensing voltage collected through a first touch sensing line S1 is great or equal to the predetermined level, it may determine that a touch occurs on the first touch sensing line S1.

In the first tactile frame interval, a first tactile voltage is applied to each of the touch driving lines D1, D2, D3, ..., Dn and the touch sensing lines S1, S2, S3, ..., Sn at the same timing.

In the second tactile frame interval, a second tactile voltage having a phase opposite to the first tactile voltage is applied to each of the touch driving lines D1, D2, D3, ..., Dn and the touch sensing lines S1, S2, S3, ..., Sn at the same timing.

As described above, in an exemplary embodiment, a first tactile voltage is applied to the touch driving lines and the touch sensing lines at the same timing in a first tactile frame interval of a vertical blanking interval, and a second tactile voltage having a phase opposite to the first tactile voltage is applied to the touch driving lines and the touch sensing lines at the same timing in a second tactile frame interval of the vertical blanking interval, such that a haptic feedback function is performed for an image displayed on a display panel.

Figure 5:
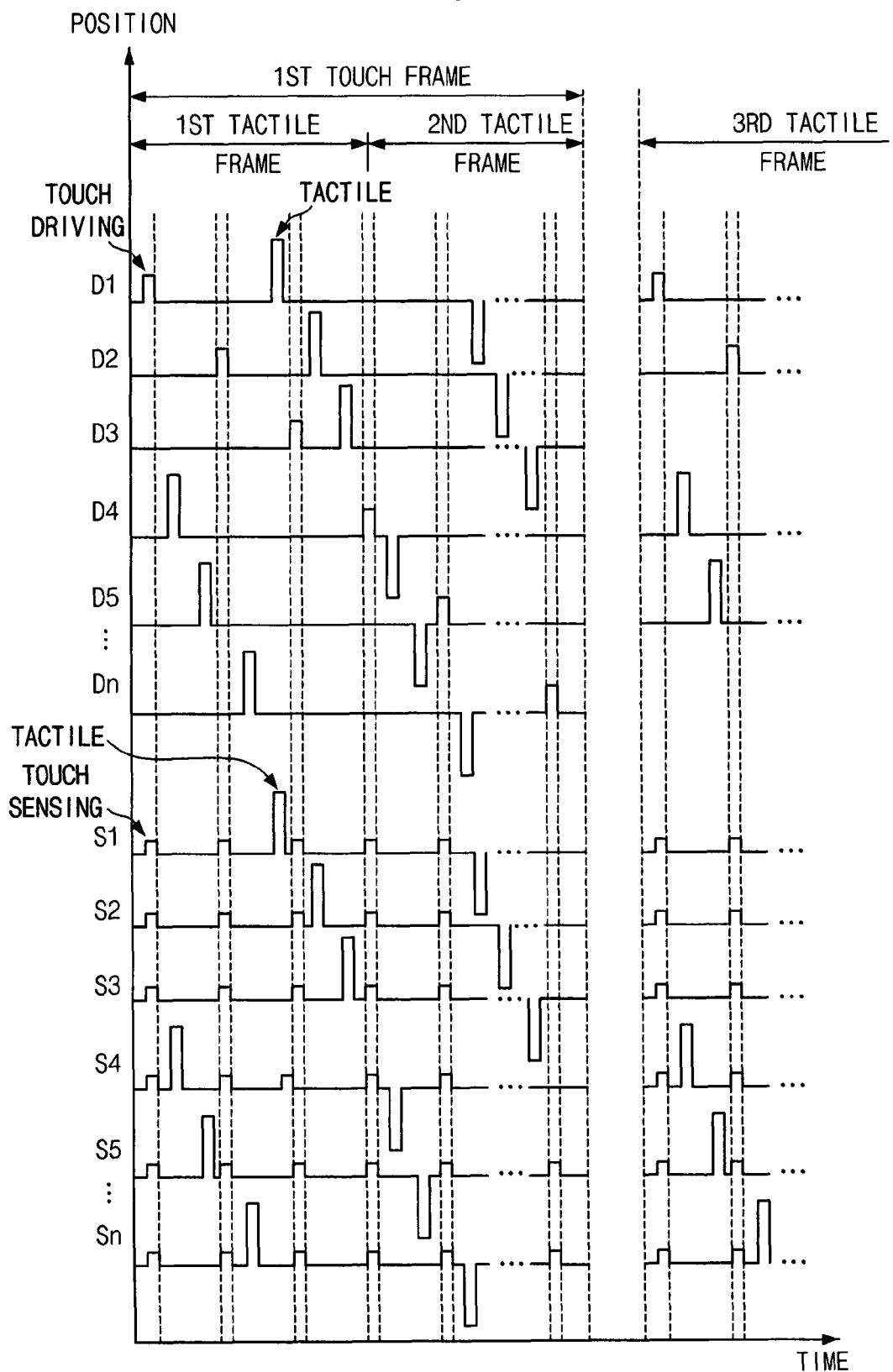
FIG. 5 is a signal timing diagram showing a transmitting/receiving timing of another alternative exemplary embodiment of a touch driving voltage, a touch sensing voltage and a tactile voltage in the touch screen apparatus described in FIG. 2.

FIG. 5 is a signal timing diagram showing a transmitting/receiving timing of another alternative exemplary embodiment of a touch driving voltage, a touch sensing voltage and a tactile voltage in the touch screen apparatus described in FIG. 2. As shown in FIG. 5, in an exemplary embodiment, the amplitudes of tactile voltages applied to the touch driving lines D1, D2, D3, ..., Dn are greater than the amplitudes of touch driving voltages applied to the touch driving lines D1, D2, D3, ..., Dn. In such an embodiment, the amplitudes of touch sensing voltages applied to the touch sensing lines S1, S2, S3, ..., Sn are less than the amplitudes of tactile voltages applied to the touch sensing lines S1, S2, S3, ..., Sn.

Referring to FIGS. 2 and 5, a touch frame interval includes a first tactile frame interval and a second tactile frame interval.

In the touch frame interval, a touch driving voltage is outputted from the touch voltage applying part 122 and sequentially applied to each of the touch driving lines D1, D2, D3, ..., Dn, and the touch sensing voltages corresponding to the touch sensing lines S1, S2, S3, ..., Sn are collected by the sensing voltage collecting part 124. In an exemplary embodiment, the sensing voltage collecting part 124 applies a voltage of a predetermine level to the touch sensing lines S1, S2, S3, ..., Sn to collect the touch sensing voltage at a time when a touch driving voltage is applied. In one exemplary embodiment, for example, a voltage of a predetermined level is continuously applied to all of the touch sensing lines S1, S2, S3, ..., Sn by a time when a touch driving voltage is applied to the touch driving lines D1, D2, D3, ..., Dn and the touch sensing lines S1, S2, S3, ..., Sn. Thus, when a first sensing voltage collected through a first touch sensing line S1 is greater or lower than the voltage of the predetermined level, it may determine that a touch occurs on the first touch sensing line S1.

In the first tactile frame interval, a first tactile voltage is sequentially applied to the touch driving voltages D1, D2, D3, ..., Dn and the touch sensing lines S1, S2, S3, ..., Sn after a touch driving voltage is applied. A time when the first tactile voltages are applied to the touch driving lines D1, D2, D3, ..., Dn and the touch sensing lines S1, S2, S3, ..., Sn does not overlap a time when the touch driving voltage is applied or a time when the touch sensing voltage is applied.

In the second tactile frame interval, a second tactile voltage having a phase opposite to the first tactile voltage is sequentially applied to the touch driving voltages D1, D2, D3, ..., Dn and the touch sensing lines S1, S2, S3, ..., Sn before a touch driving voltage is applied. A time when the second tactile voltages are applied to the touch driving lines D1, D2, D3, ..., Dn and the touch sensing lines S1, S2, S3, ..., Sn does not overlap a time when the touch driving voltage is applied to the touch driving lines D1, D2, D3, ..., Dn or a time when the touch sensing voltage is applied to the touch sensing lines S1, S2, S3, ..., Sn.

In an exemplary embodiment, as shown in FIG. 5, a tactile voltage is applied to all of the touch driving lines D1, D2, D3, ..., Dn and all of the touch sensing lines S1, S2, S3, ..., Sn. In an alternative exemplary embodiment, the tactile voltage may be locally applied in accordance with an area where a touch occurs.

In one exemplary embodiment, for example, when the sensing voltage collecting part 124 collects the touch sensing voltage, the timing control part 160 may determine that a touch occurs at a position. In such an embodiment, the timing control part 160 provides the tactile voltage applying part 126 with information for the position of the touch. The tactile voltage applying part 126 applies a tactile voltage to a touch driving line in a portion corresponding to the position of the touch and a touch sensing line in the portion corresponding to the position of the touch. In such an embodiment, the number of the touch driving lines in the portion corresponding to the position of the touch may be greater than two. In such an embodiment, the number of the touch sensing lines in the portion corresponding to the position of the touch may be greater than two.

As described above, in an exemplary embodiment, a first tactile voltage is applied to the touch driving lines and the touch sensing lines in a first tactile frame interval in a touch frame interval when a touch driving voltage is applied to the touch driving lines and a second tactile voltage having a phase opposite to the first tactile voltage is applied to the touch driving lines and the touch sensing lines in a second tactile frame interval in the touch frame interval, such that a haptic feedback function is performed for an image displayed on a display panel.

Figure 6:
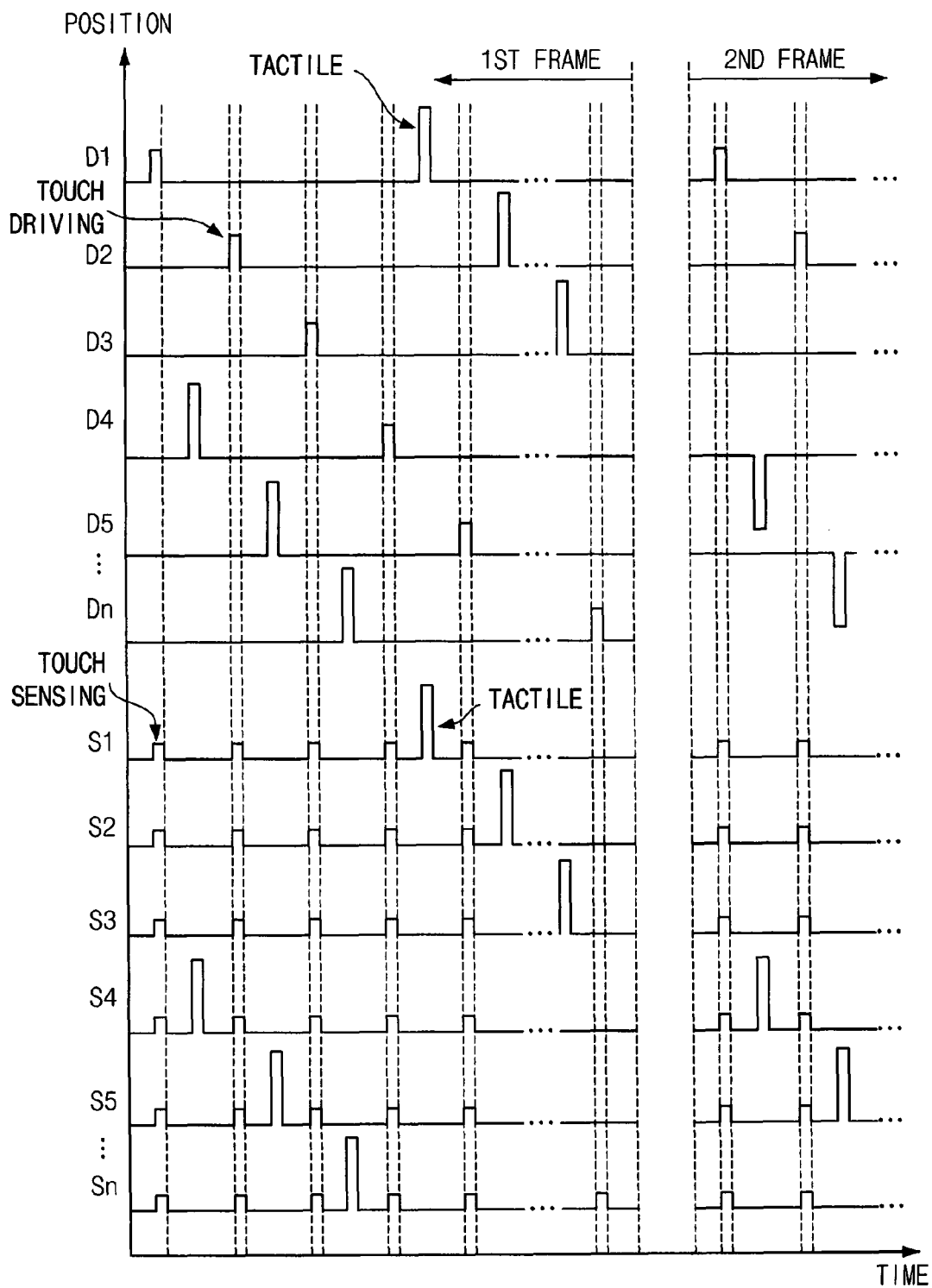
FIG. 6 is a signal timing diagram showing a transmitting/receiving timing of another alternative exemplary embodiment of a touch driving voltage, a touch sensing voltage and a tactile voltage in the touch screen apparatus described in FIG. 2.

FIG. 6 is a signal timing diagram showing a transmitting/receiving timing of another alternative exemplary embodiment of a touch driving voltage, a touch sensing voltage and a tactile voltage in the touch screen apparatus described in FIG. 2. In an exemplary embodiment, as shown in FIG. 6, the amplitudes of tactile voltages applied to the touch driving lines D1, D2, D3, ..., Dn are greater than the amplitudes of touch driving voltages applied to the touch driving lines D1, D2, D3, ..., Dn. In such an embodiment, the amplitudes of touch sensing voltages applied to the touch sensing lines S1, S2, S3, ..., Sn are less than the amplitudes of tactile voltages applied to the touch sensing lines S1, S2, S3, ..., Sn.

Referring to FIGS. 2 and 6, in an odd-numbered vertical blanking interval, during which an image is not displayed on the display panel, e.g., the vertical blanking interval of the second period, a touch driving voltage is outputted from the touch voltage applying part 122 and sequentially applied to each of the touch driving lines D1, D2, D3, ..., Dn, and the touch sensing voltages corresponding to the touch sensing lines S1, S2, S3, ..., Sn are collected by the sensing voltage collecting part 124. In such an embodiment, a first tactile voltage is sequentially applied to each of the touch driving lines D1, D2, D3, ..., Dn and each of the touch sensing lines S1, S2, S3, ..., Sn, in a time when the touch driving voltage is not applied to the touch driving lines D1, D2, D3, ..., Dn and the touch sensing voltage is not collected.

In an even-numbered vertical blanking interval, e.g., the vertical blanking interval of the first frame, a touch driving voltage is outputted from the touch voltage applying part 122 and sequentially applied to each of the touch driving lines D1, D2, D3, ..., Dn, and the touch sensing voltages corresponding to the touch sensing lines S1, S2, S3, ..., Sn are collected by the sensing voltage collecting part 124. In such an embodiment, a second tactile voltage having a phase opposite to the first tactile voltage is sequentially applied to the touch driving lines D1, D2, D3, ..., Dn and the touch sensing lines S1, S2, S3, ..., Sn, during a time when the touch driving voltage is not applied to the touch driving lines D1, D2, D3, ..., Dn and the touch sensing voltage is not collected.

In an exemplary embodiment, as shown in FIG. 6, the sensing voltage collecting part 124 applies a voltage of a predetermined level to the touch sensing lines S1, S2, S3, ..., Sn during a time when a touch driving voltage is applied to the touch driving lines D1, D2, D3, ..., Dn. In one exemplary embodiment, for example, a voltage of a predetermined level is continuously applied to all of the touch sensing lines S1, S2, S3, ..., Sn during a time when a touch driving voltage is applied to the touch driving lines D1, D2, D3, ..., Dn. Thus, when a first sensing voltage collected through a first touch sensing line S1 is greater or lower the voltage of the predetermined level, it may determine that a touch occurs on the first touch sensing line S1.

As shown in FIG. 6, a tactile voltage is sequentially applied to all of the touch driving lines D1, D2, D3, ..., Dn and all of the touch sensing lines S1, S2, S3, ..., Sn. In an alternative exemplary embodiment, the tactile voltage may be locally applied in accordance with an area where a touch occurs.

As described above, in an exemplary embodiment, a first tactile voltage is sequentially applied thereto in an odd-numbered vertical blanking interval, during which an image is not displayed on the display panel, and a second tactile voltage having a phase opposite to the first tactile voltage is sequentially applied thereto in an even-numbered vertical blanking interval, during which an image is not displayed on the display panel, such that a haptic feedback function is performed for an image displayed on a display panel.

Figure 7:
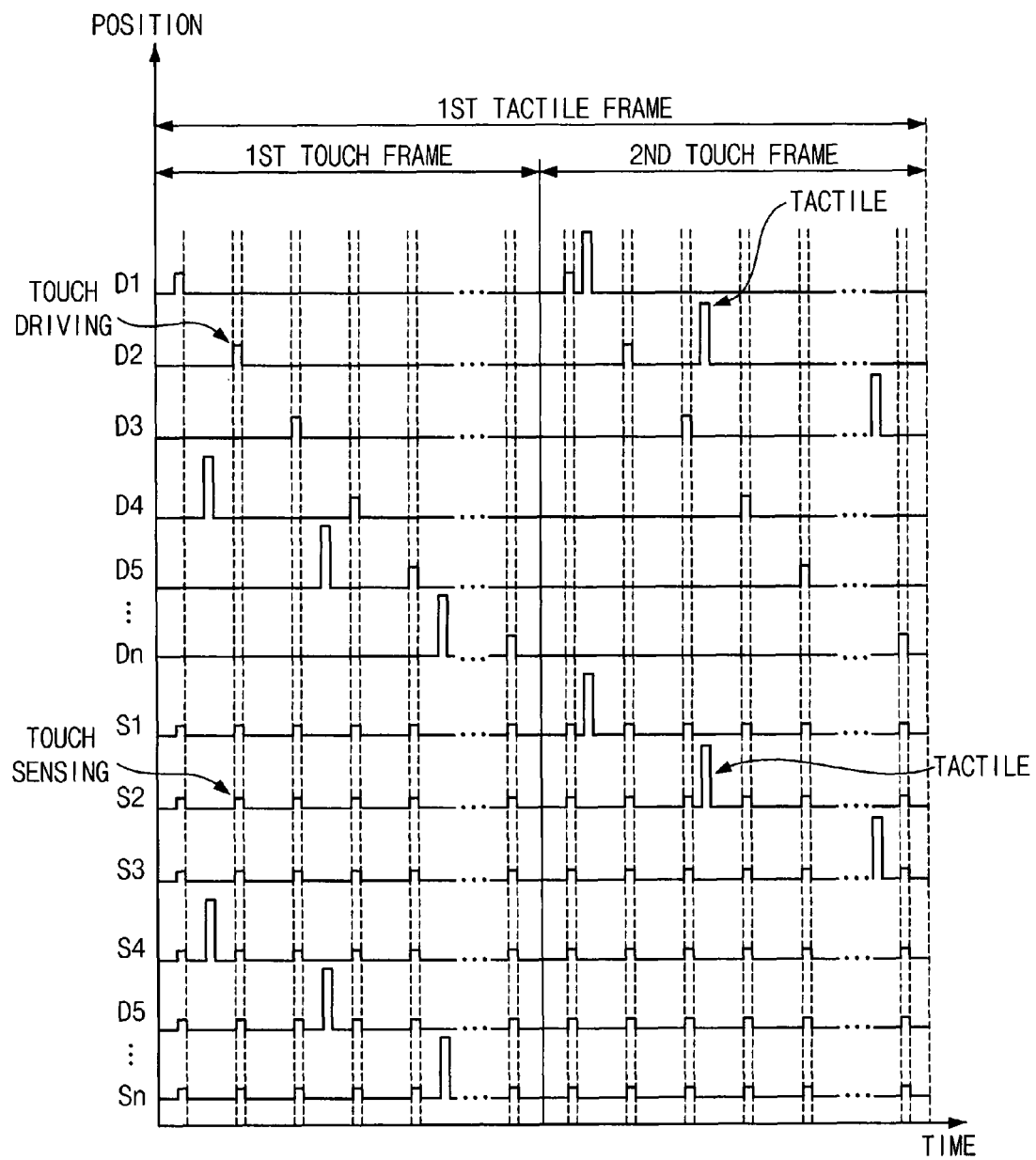
FIG. 7 is a signal timing diagram showing a transmitting/receiving timing of another alternative exemplary embodiment of a touch driving voltage, a touch sensing voltage and a tactile voltage in the touch screen apparatus described in FIG. 2.

FIG. 7 is a signal timing diagram showing a transmitting/receiving timing of another alternative exemplary embodiment of a touch driving voltage, a touch sensing voltage and a tactile voltage in the touch screen apparatus described in FIG. 2. As shown in FIG. 7, in an exemplary embodiment, the amplitudes of tactile voltages applied to the touch driving lines D1, D2, D3, ..., Dn are greater than the amplitudes of touch driving voltages applied to the touch driving lines D1, D2, D3, ..., Dn. In such an embodiment, the amplitudes of touch sensing voltages applied to the touch sensing lines S1, S2, S3, ..., Sn are less than the amplitudes of tactile voltages applied to the touch sensing lines S1, S2, S3, ..., Sn.

Referring to FIGS. 2 and 7, two touch frame intervals (i.e., a first touch frame interval and a second touch frame interval) may correspond to a tactile frame interval. A tactile voltage is applied to the touch driving lines D1, D2, D3, . . . , Dn before a touch driving voltage is applied to the touch driving lines D1, D2, D3, . . . , Dn in a first touch frame interval, and a tactile voltage is applied to the touch driving lines D1, D2, D3, . . . , Dn after a touch driving voltage is applied to the touch driving lines D1, D2, D3, . . . , Dn in a second touch frame interval.

In the first touch frame interval, a touch driving voltage is outputted from the touch voltage applying part 122 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 124. In such an embodiment, a tactile voltage is applied to the touch driving lines D1, D2, D3, . . . , Dn and the touch sensing lines S1, S2, S3, . . . , Sn before a touch driving voltage is applied to the touch driving lines D1, D2, D3, . . . , Dn.

In the second touch frame interval, a touch driving voltage is outputted from the touch voltage applying part 122 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 124. In such an embodiment, a tactile voltage is applied to the touch driving lines D1, D2, D3, . . . , Dn and the touch sensing lines S1, S2, S3, . . . , Sn after a touch driving voltage is applied to the touch driving lines D1, D2, D3, . . . , Dn.

In an exemplary embodiment, as shown in FIG. 7, the sensing voltage collecting part 124 applies a voltage of a predetermined level to the touch sensing lines S1, S2, S3, . . . , Sn during a time when a touch driving voltage is applied to the touch driving lines D1, D2, D3, . . . , Dn to collect the touch sensing voltage. In one exemplary embodiment, for example, a voltage of a predetermined level is continuously applied to all of touch sensing lines S1, S2, S3, . . . , Sn during a time when a touch driving voltage is applied to the touch driving lines D1, D2, D3, . . . , Dn. Thus, when a first sensing voltage collected through a first touch sensing line S1 is greater or lower the voltage of the predetermined level, it may determine that a touch occurs on the first touch sensing line S1.

As shown in FIG. 7, a tactile voltage is applied to all of the touch driving lines D1, D2, D3, . . . , Dn and all of the touch sensing lines S1, S2, S3, . . . , Sn. In an alternative exemplary embodiment, the tactile voltage may be locally applied in accordance with an area where a touch occurs.

As described above, in an exemplary embodiment, a tactile frame interval is set to include two touch frame intervals, a tactile voltage is sequentially applied to the touch driving lines and the touch sensing lines before a touch driving voltage is applied to the touch driving lines in a first touch frame interval, of the two touch frame intervals and a tactile voltage is sequentially applied to the touch driving lines and the touch sensing lines after a touch driving voltage is applied to the touch driving lines in a second touch frame interval of the two touch frame intervals, such that a haptic feedback function is performed for an image displayed on a display panel.

Figure 8:
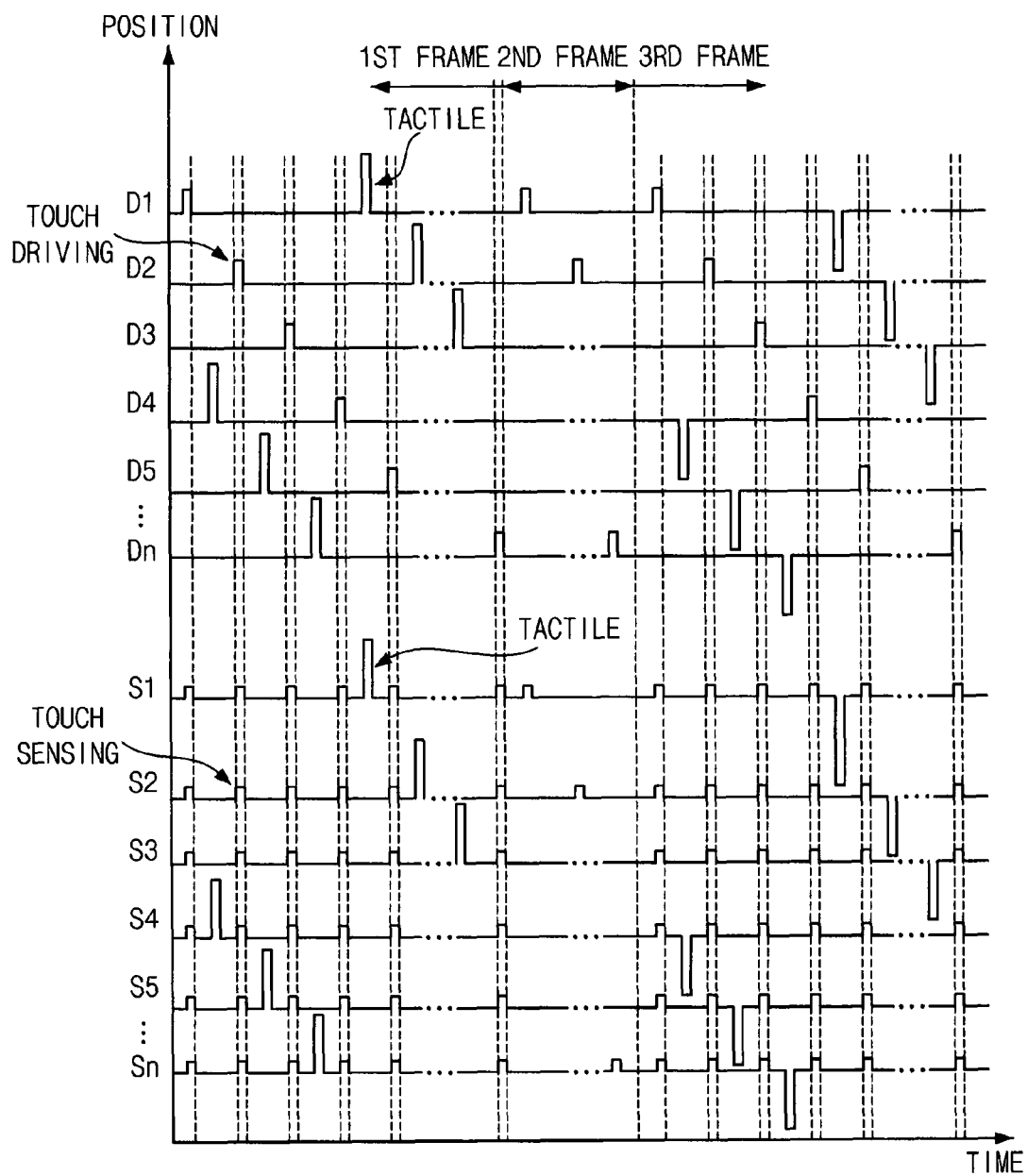
FIG. 8 is a signal timing diagram showing a transmitting/receiving timing of another alternative exemplary embodiment of a touch driving voltage, a touch sensing voltage and a tactile voltage in the touch screen apparatus described in FIG. 2.

FIG. 8 is a signal timing diagram showing a transmitting/receiving timing of another alternative exemplary embodiment of a touch driving voltage, a touch sensing voltage and a tactile voltage in the touch screen apparatus described in FIG. 2. As shown in FIG. 8, in an exemplary embodiment, the amplitudes of tactile voltages applied to the touch driving lines D1, D2, D3, . . . , Dn are greater than the amplitudes of touch driving voltages applied to the touch driving lines D1, D2, D3, . . . , Dn. In such an embodiment, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 2 and 8, in a (4N-3)-th touch frame interval (here, 'N' is a natural number), e.g., a touch frame interval in a first frame, a touch driving voltage is outputted from the touch voltage applying part 122 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 124. In the (4N-3)-th touch frame interval, a first tactile voltage is sequentially applied to the touch driving lines D1, D2, D3, . . . , Dn and the touch sensing lines S1, S2, S3, . . . , Sn in another time different from a time when a touch sensing voltage is sensed from each of the touch sensing lines S1, S2, S3, . . . , Sn.

In a (4N-2)-th touch frame interval, e.g., a touch frame interval in a second frame, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 124. In the (4N-2)-th touch frame interval, the first tactile voltage is not applied to the touch driving lines D1, D2, D3, . . . , Dn and the touch sensing lines S1, S2, S3, . . . , Sn.

In a (4N-1)-th touch frame interval, e.g., a touch frame interval in a third frame, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 124. In the (4N-1)-th touch frame interval, a second tactile voltage having a phase opposite to the first tactile voltage is sequentially applied to the touch driving lines D1, D2, D3, . . . , Dn and the touch sensing lines S1, S2, S3, . . . , Sn in another time different from a time when a touch sensing voltage is sensed from each of the touch sensing lines S1, S2, S3, . . . , Sn.

In a 4N-th touch frame interval, e.g., a touch frame interval in a fourth frame (not shown in FIG. 6), a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 124. In the 4N-th touch frame interval, the second tactile voltage is not applied to the touch driving lines D1, D2, D3, . . . , Dn and the touch sensing lines S1, S2, S3, . . . , Sn.

In an exemplary embodiment, as shown in FIG. 8, the sensing voltage collecting part 124 applies a voltage of a predetermined level to the touch sensing lines S1, S2, S3, . . . , Sn during a time when a touch driving voltage is applied to the touch driving lines D1, D2, D3, . . . , Dn. In one exemplary embodiment, for example, a voltage of a predetermined level is continuously applied to all of the touch sensing lines S1, S2, S3, . . . , Sn during a time when a touch driving voltage is applied to the touch driving lines D1, D2, D3, . . . , Dn. Thus, when a first sensing voltage collected through a first touch sensing line S1 is greater or lower the voltage of the predetermined level, it may determine that a touch occurs on the first touch sensing line S1.

As described above, in an exemplary embodiment, tactile voltages are sequentially applied to the touch driving lines and the touch sensing lines in second and fourth touch frame intervals, and tactile voltages are sequentially applied to the touch driving lines and the touch sensing lines in first and third touch frame intervals, such that a haptic feedback function is performed for an image displayed on a display panel.

Figure 9:
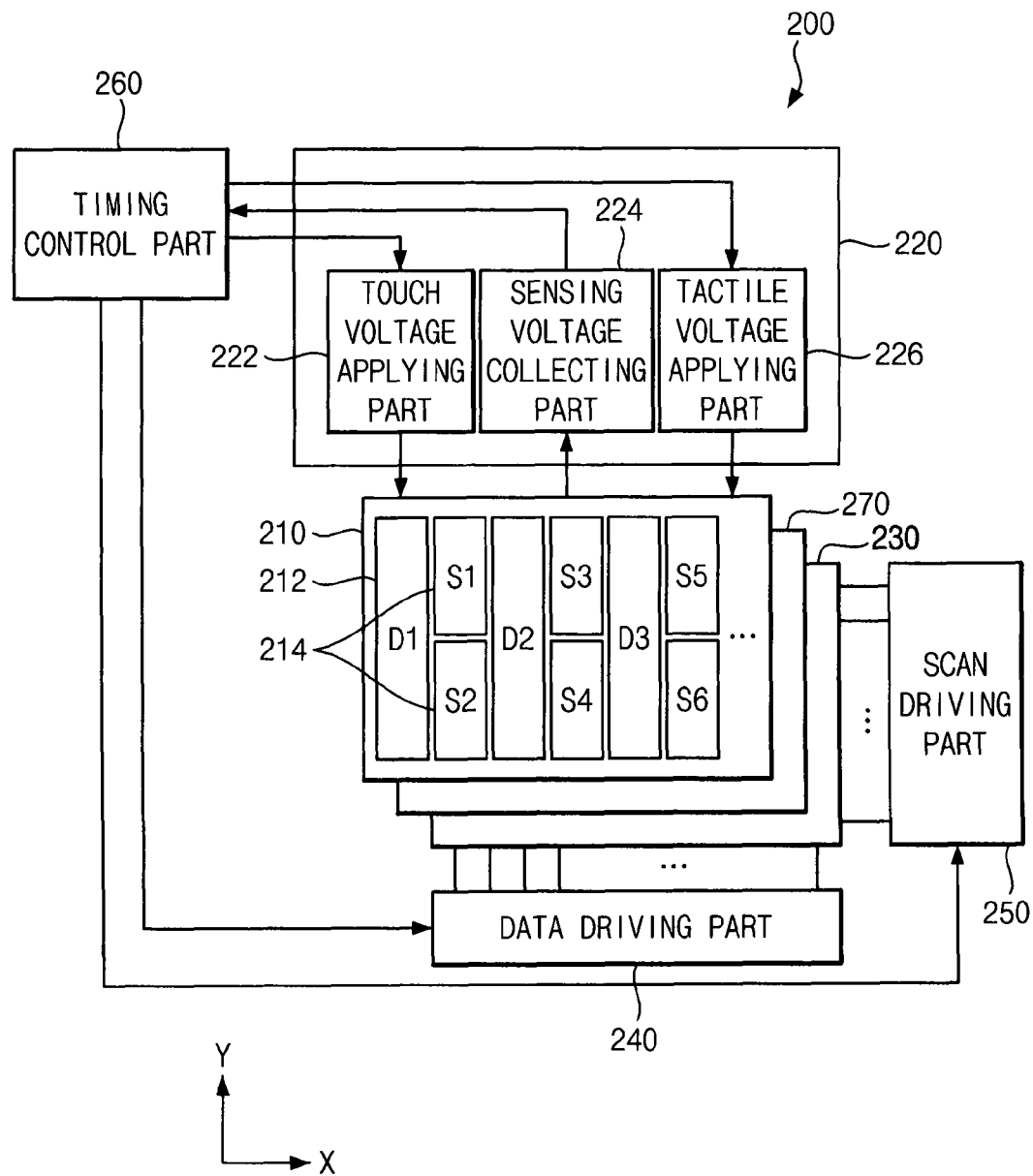
FIG. 9 is a block diagram showing an alternative exemplary embodiment of a touch screen apparatus according to the invention.

FIG. 9 is a block diagram showing an alternative exemplary embodiment of a touch screen apparatus according to the invention.

Referring to FIG. 9, an alternative exemplary embodiment of a touch screen apparatus 200 according to the invention includes a tactile touch panel 210, a voltage transmitting/receiving part 220, a display panel 230, a data driving part 240, a scan driving part 250 and a timing control part 260.

The tactile touch panel 210 includes a plurality of touch driving lines 212 and a plurality of touch sensing lines 214 to perform a touch function and a haptic feedback function. The touch driving lines 212 may extend substantially parallel to a Y-axis and arranged in an X-axis. The touch sensing lines 214 may extend substantially parallel to an X-axis and arranged in a Y-axis. In an exemplary embodiment, the touch driving lines 212 has an ITO pattern structure of a bar shape. In such an embodiment, the touch sensing lines 214 has an ITO pattern structure of a bar shape. A size of each of the touch driving lines 212 may be greater than a size of each of the touch sensing lines 214.

Each of the touch driving lines 212 is connected to a touch voltage applying part 222 through a driving router (not shown). Each of the touch driving lines 212 receives a touch driving voltage from the touch voltage applying part 222 through the driving router.

Each of the touch sensing lines 214 is connected to a sensing collecting part 224 through a sensing router (not shown). Each of the touch sensing routers 214 deliveries a touch sensing voltage to the sensing voltage collecting part 224 through the sensing router.

Each of the touch driving lines 212 may include an ITO pattern, e.g., a single ITO pattern, which extends substantially parallel to the Y-axis. In an alternative exemplary embodiment, each of the touch driving lines 212 may include a plurality of ITO patterns.

In an exemplary embodiment, where each of the touch driving lines 212 includes a single ITO pattern, each of the touch sensing lines 214 is configured to include a plurality of ITO patterns disposed in adjacent to the touch driving lines 212, respectively.

In an exemplary embodiment, where each of the touch driving lines 212 includes the plurality of ITO patterns, each of the touch sensing lines 214 may be configured to include a plurality of ITO patterns to be disposed in adjacent to each of the touch driving lines 212 in a zigzag shape. In such an embodiment, each of the touch driving lines 212 disposed in Y-axis and each of the touch sensing lines 214 disposed in Y-axis may be disposed in a zigzag shape.

The voltage transmitting/receiving part 220 includes the touch voltage applying part 222, the sensing voltage collecting part 224 and a tactile voltage applying part 226 to be connected to the tactile touch panel 210 and the timing control part 270, respectively.

The touch voltage applying part 222 is connected to the touch driving lines 212, respectively, to apply a touch driving voltage to the touch driving lines 212.

The sensing voltage collecting part 222 is connected to the touch sensing lines 214, respectively, to receive a touch sensing voltage. The sensing voltage collecting part 222 provides the timing control part 260 with the received touch sensing voltage.

The tactile voltage applying part 226 is connected to each of the touch driving lines 212 and the touch sensing lines 214 and applies a tactile voltage corresponding to an image displayed on the display panel 230 to the touch driving lines 212 and the touch sensing lines 214 in a blanking interval when a touch driving voltage is not applied to the touch driving lines 212.

The blanking interval may be a vertical blanking interval of an image. The tactile voltage may be greater than a touch driving voltage. In one exemplary embodiment, for example, when an image displayed on the display panel 230 is an image having an uneven texture, the tactile voltage applying part 226 provides the touch driving lines 212 and the touch sensing lines 214 with a tactile voltage having a first level. The tactile voltage may be applied in an alternating manner to increase a haptic feedback effect. In one exemplary embodiment, for example, a first tactile voltage having a first phase may be applied to the touch driving lines 212 and the touch sensing lines 214 in a first blanking interval, and a second tactile voltage having a second phase opposite to the first phase may be applied to the touch driving lines 212 and the touch sensing lines 214 in a second blanking interval.

The tactile voltage applying part 226 and the touch voltage applying part 222 operate in different timings. Operations of the touch voltage applying part 222 and the tactile voltage applying part 226 may be controlled by the timing control part 260.

The display panel 230 is disposed below the tactile touch panel 210. The display panel 230 is substantially the same as the display panel 130 described with reference to FIG. 2, and thus any repetitive detailed description thereof will hereinafter be omitted.

Each of the data driving part 240 and the scan driving part 250 is substantially the same as the data driving part 140 and the scan driving part 160 described with reference to FIG. 2, and thus any repetitive detailed description thereof will hereinafter be omitted.

In an exemplary embodiment, the timing control part 260 provides the data driving part 250 with an image data for displaying an image on the display panel 230 and a first control signal corresponding to the image data, and provides the scan driving part 260 with a second control signal for activating a switching element disposed on the display panel 230. In an exemplary embodiment, the timing control part 260 provides the touch voltage applying part 222 with a third control signal for performing a touch function, and receives a touch sensing voltage provided from the sensing voltage collecting part 230. In an exemplary embodiment, the timing control part 260 provides the tactile voltage applying part 224 with a fourth control signal for performing a haptic feedback function.

In an exemplary embodiment, the touch screen apparatus 200 may further include a shielding layer 270. The shielding layer 270 is disposed between the tactile touch panel 210 and the display pane 230 and blocks that the tactile voltage outputted from the tactile voltage applying part 226 to be applied to the display panel 230.

In an alternative exemplary embodiment, the shielding layer 270 may disposed within the display panel 230. In an exemplary embodiment, where the display panel 230 is a liquid crystal display panel including an array substrate, an opposite substrate opposite to the array substrate and a liquid crystal layer interposed between the array substrate and the opposite substrate, the shielding layer 270 may be disposed on the opposite substrate. In an alternative exemplary embodiment, the shielding layer 270 may be disposed on the array substrate.

Hereinafter, the timings of exemplary embodiments of the touch driving voltage and a tactile voltage applied to the tactile touch panel 210 described in FIG. 9 will be described. In the following signal timing diagrams, D1, D2, D3, . . . , Dn denote the touch driving lines, and S1, S2, S3, . . . , Sn denote the touch sensing lines, where n is a natural number.

Figure 10:
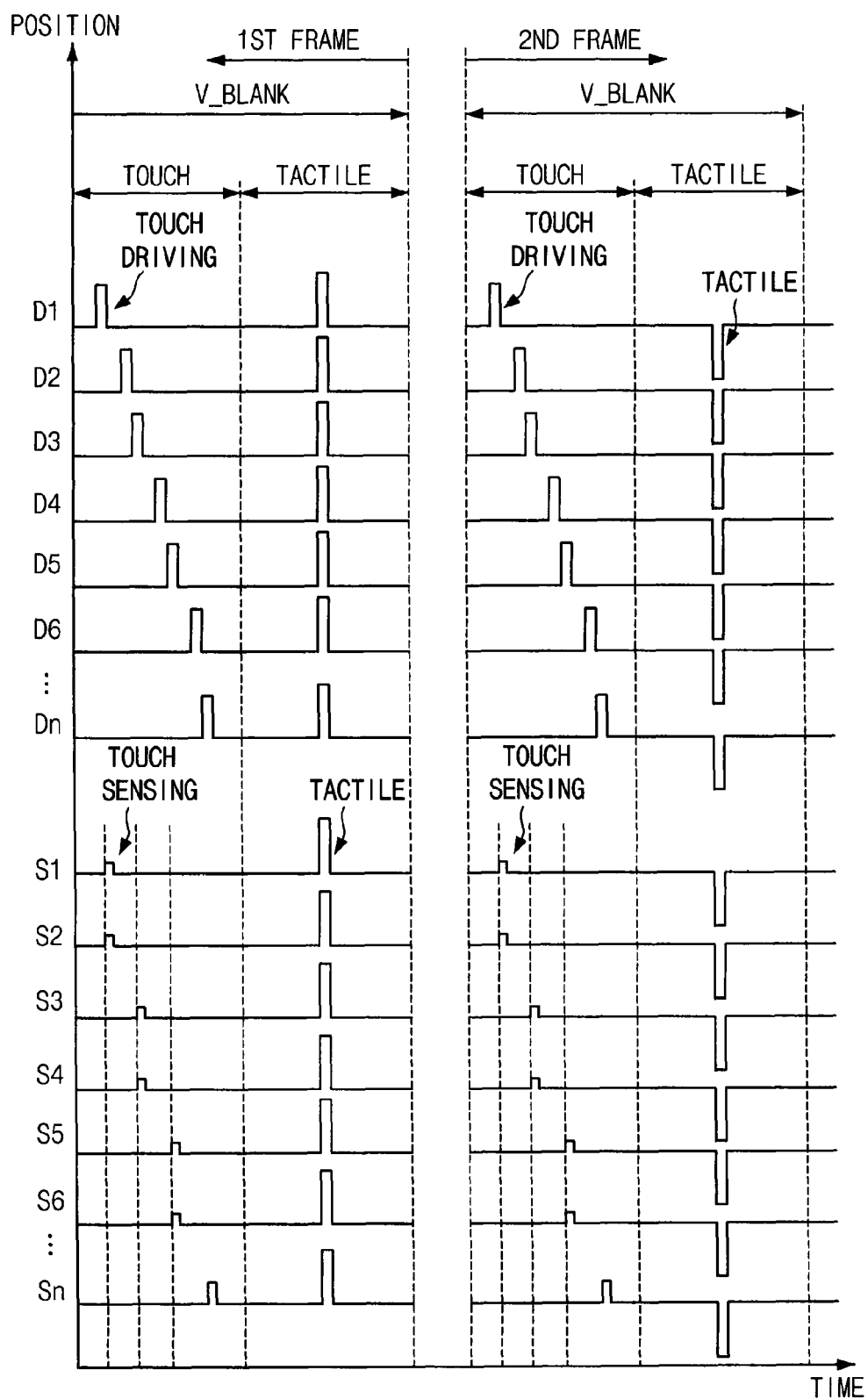
FIG. 10 is a signal timing diagram showing a transmitting/receiving timing of an exemplary embodiment of a touch driving voltage, a touch sensing voltage and a tactile voltage in the touch screen apparatus described in FIG. 9.

FIG. 10 is a signal timing diagram showing a transmitting/receiving timing of an exemplary embodiment of a touch driving voltage, a touch sensing voltage and a tactile voltage in the touch screen apparatus described in FIG. 9. As shown in FIG. 10, in an exemplary embodiment, the amplitudes of tactile voltages applied to the touch driving lines D1, D2, D3, . . . , Dn are greater than the amplitudes of touch driving voltages applied to the touch driving lines D1, D2, D3, . . . , Dn. In such an embodiment, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 9 and 10, an odd-numbered vertical blanking interval, which follows an odd-numbered vertical blanking interval when an image is not displayed on the display panel, includes a first touch interval and a first tactile interval, and an even-numbered vertical blanking interval, which follows an even-numbered frame when the an image is not displayed on the display panel, includes a second touch interval and a second tactile interval.

In the first touch interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 224. In an exemplary embodiment, as shown in FIG. 9, two touch sensing lines correspond to one touch driving line. In such an embodiment, the sensing voltage collecting part 224 simultaneously collects touch sensing voltages from a first touch sensing line S1 and a second touch sensing line S1 to collect a touch sensing voltage corresponding to a touch driving voltage applied to a first touch driving line D1. In such an embodiment, the sensing voltage collecting part 224 simultaneously collects touch sensing voltages from a third touch sensing line S3 and a fourth touch sensing line S4 to collect a touch sensing voltage corresponding to a touch driving voltage applied to a second touch driving line D2.

In the first tactile interval, a first tactile voltage is simultaneously applied to each of the touch driving lines D1, D2, D3, . . . , Dn and the touch sensing lines S1, S2, S3, . . . , Sn.

In the second tactile interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 224.

In the third tactile interval, a second tactile voltage having an opposite to the first tactile voltage is simultaneously applied to each of the touch driving lines D1, D2, D3, . . . , Dn and the touch sensing lines S1, S2, S3, . . . , Sn.

In an exemplary embodiment, as shown in FIG. 10, a tactile voltage is simultaneously applied to all of the touch driving lines D1, D2, D3, . . . , Dn and all of the touch sensing lines S1, S2, S3, . . . , Sn. In an alternative exemplary embodiment, the tactile voltage may be locally applied in accordance with an area where a touch occurs.

In one exemplary embodiment, for example, when the sensing voltage collecting part 224 collects the touch sensing voltage, the timing control part 260 may determine that a touch occurs at a position. In such an embodiment, the timing control part 260 provides the tactile voltage applying part 226 with information for the position of the touch. The tactile voltage applying part 226 applies a tactile voltage to a touch driving line in a portion corresponding to the position of the touch and a touch sensing line in the portion corresponding to the position of the touch. In such an embodiment, the number of the touch driving lines in the portion corresponding to the position of the touch may be greater than two. In such an embodiment, the number of the touch sensing lines in the portion corresponding to the position of the touch may be greater than two.

As described above, in an exemplary embodiment, a first tactile voltage is simultaneously applied to the touch driving lines and the touch sensing lines in a first tactile interval of an odd-numbered touch frame interval, and a second tactile voltage having a phase opposite to the first tactile voltage is applied to the touch driving lines and the touch sensing lines in a second tactile interval of an even-numbered touch frame interval, such that a haptic feedback function is performed for an image displayed on a display panel.

Figure 11:
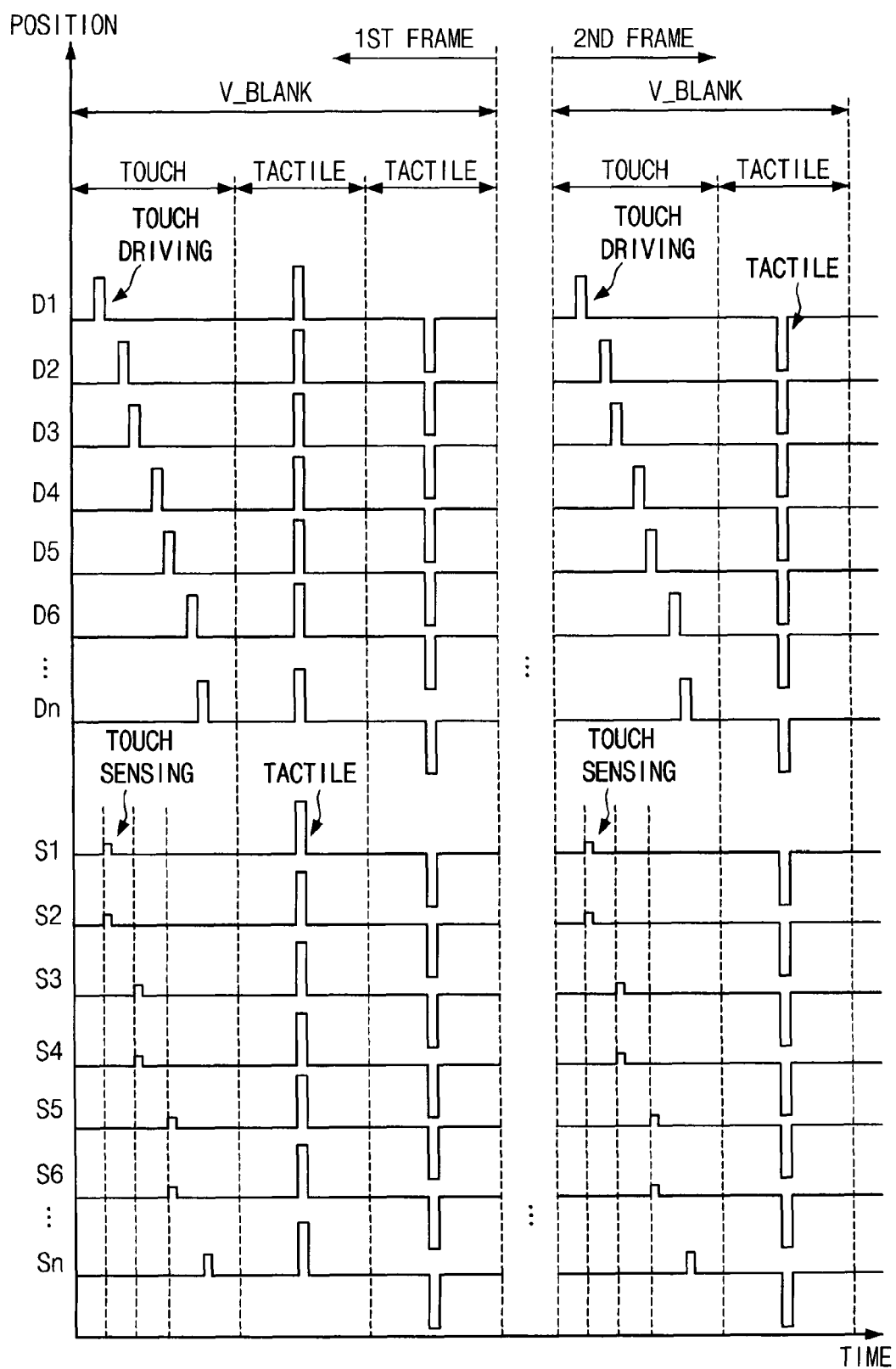
FIG. 11 is a signal timing diagram showing a transmitting/receiving timing of an alternative exemplary embodiment of a touch driving voltage, a touch sensing voltage and a tactile voltage in the touch screen apparatus described in FIG. 9.

FIG. 11 is a signal timing diagram showing a transmitting/receiving timing of an alternative exemplary embodiment of a touch driving voltage, a touch sensing voltage and a tactile voltage in the touch screen apparatus described in FIG. 9. In an exemplary embodiment, as shown in FIG. 11, the amplitudes of tactile voltages applied to the touch driving lines D1, D2, D3, . . . , Dn are greater than the amplitudes of touch driving voltages applied to the touch driving lines D1, D2, D3, . . . , Dn. In such an embodiment, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 9 and 11, a vertical blanking interval, during which an image is not displayed on a display panel, includes a touch interval and a tactile interval. The tactile interval includes a first tactile frame interval and a second tactile frame interval.

In the touch interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 224. In an exemplary embodiment, as shown in FIG. 11, two touch sensing lines correspond to one touch driving line. In such an embodiment, the sensing voltage collecting part 224 simultaneously collects touch sensing voltages from a first touch sensing line S1 and a second touch sensing line S1 collect a touch sensing voltage corresponding to a touch driving voltage applied to a first touch driving line D1. In such an embodiment, the sensing voltage collecting part 224 simultaneously collects touch sensing voltages from a third touch sensing line S3 and a fourth touch sensing line S4 to collect a touch sensing voltage corresponding to a touch driving voltage applied to a second touch driving line D2.

In the first tactile frame interval, a first tactile voltage is sequentially applied to each of the touch driving lines D1, D2, D3, . . . , Dn and the touch sensing lines S1, S2, S3, . . . , Sn.

In the second tactile frame interval, a second tactile voltage having a phase opposite to the first tactile voltage is sequentially applied to each of the touch driving lines D1, D2, D3, . . . , Dn and the touch sensing lines S1, S2, S3, . . . , Sn.

As described above, in an exemplary embodiment, a first tactile voltage is sequentially applied to the touch driving lines and the touch sensing lines in a first tactile frame interval of a vertical blanking interval, and a second tactile voltage having a phase opposite to the first tactile voltage is sequentially applied to the touch driving lines and the touch sensing lines in a second tactile frame interval of a vertical blanking interval, such that a haptic feedback function is performed for an image displayed on a display panel.

Figure 12:
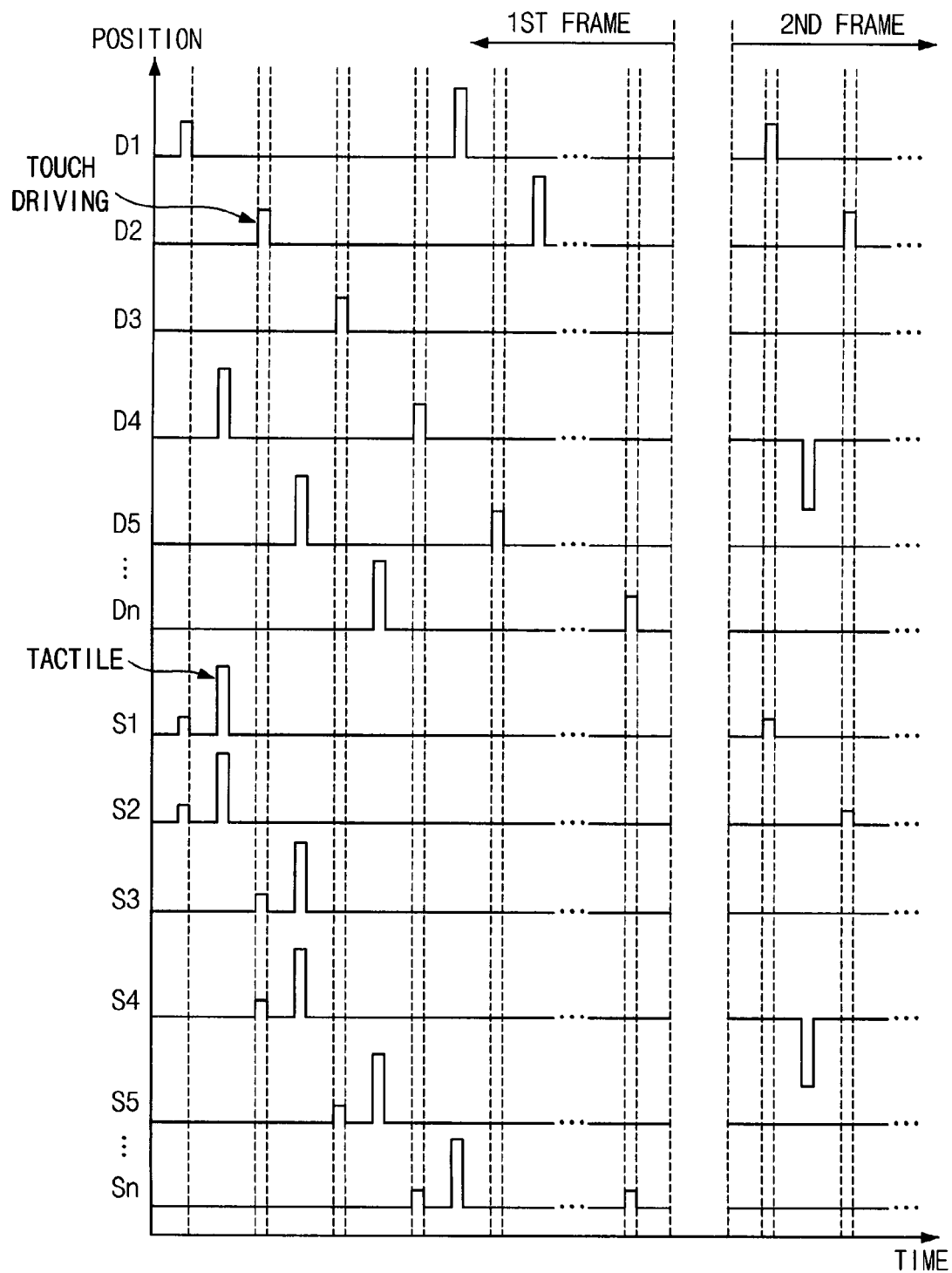
FIG. 12 is a signal timing diagram showing a transmitting/receiving timing of another alternative exemplary embodiment of a touch driving voltage, a touch sensing voltage and a tactile voltage in the touch screen apparatus described in FIG. 9.

FIG. 12 is a signal timing diagram showing a transmitting/receiving timing of another alternative exemplary embodiment of a touch driving voltage, a touch sensing voltage and a tactile voltage in the touch screen apparatus described in FIG. 9. In an exemplary embodiment, as shown in FIG. 12, the amplitudes of tactile voltages applied to the touch driving lines D1, D2, D3, . . . , Dn are greater than the amplitudes of touch driving voltages applied to the touch driving lines D1, D2, D3, . . . , Dn. In such an embodiment, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 9 and 12, in an odd-numbered touch frame interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 224. In such an embodiment, first tactile voltages are sequentially applied to the touch driving lines D1, D2, D3, . . . , Dn and the touch sensing lines S1, S2, S3, . . . , Sn. A time when the first tactile voltages are applied to the touch driving lines D1, D2, D3, . . . , Dn and the touch sensing lines S1, S2, S3, . . . , Sn does not overlap a time when the touch driving voltage is applied to the touch driving lines D1, D2, D3, . . . , Dn or a time when the touch sensing voltage is applied to the touch sensing lines S1, S2, S3, . . . , Sn.

In an even-numbered touch frame interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 224. In such an embodiment, second tactile voltages having a phase opposite to the first tactile voltage are sequentially applied to the touch driving lines D1, D2, D3, . . . , Dn and the touch sensing lines S1, S2, S3, . . . , Sn. A time when the second tactile voltages are applied to the touch driving lines D1, D2, D3, . . . , Dn and the touch sensing lines S1, S2, S3, . . . , Sn does not overlap a time when the touch driving voltage is applied to the touch driving lines D1, D2, D3, . . . , Dn or a time when the touch sensing voltage is applied to the touch sensing lines S1, S2, S3, . . . , Sn.

In an exemplary embodiment, as shown in FIG. 9, two touch sensing lines correspond to one touch driving line. In such an embodiment, the sensing voltage collecting part 224 simultaneously collects touch sensing voltages from a first touch sensing line S1 and a second touch sensing line S1 to collect a touch sensing voltage corresponding to a touch driving voltage applied to a first touch driving line D1. In such an embodiment, the sensing voltage collecting part 224 simultaneously collects touch sensing voltages from a third touch sensing line S3 and a fourth touch sensing line S4 to collect a touch sensing voltage corresponding to a touch driving voltage applied to a second touch driving line D2.

In an exemplary embodiment, as shown in FIG. 12, a tactile voltage is simultaneously applied to all of the touch driving lines D1, D2, D3, . . . , Dn and all of the touch sensing lines S1, S2, S3, . . . , Sn. In an alternative exemplary embodiment, the tactile voltage may be locally applied in accordance with an area where a touch occurs.

In one exemplary embodiment, for example, when the sensing voltage collecting part 224 collects the touch sensing voltage, the timing control part 260 may determine that a touch occurs at a position. In such an embodiment, the timing control part 260 provides the tactile voltage applying part 226 with information for the position of the touch. The tactile voltage applying part 226 applies a tactile voltage to a touch driving line in a portion corresponding to the position of the touch and a touch sensing line in the portion corresponding to the position of the touch. In such an embodiment, the number of the touch driving lines in the portion corresponding to the position of the touch may be greater than two. In such an embodiment, the number of the touch sensing line in the portion corresponding to the position of the touch may be greater than two.

As described above, in an exemplary embodiment, a first tactile voltage is simultaneously applied to the touch driving lines and the touch sensing lines in an odd-numbered touch frame interval, and a second tactile voltage having a phase opposite to the first tactile voltage is applied to the touch sensing lines in an even-numbered touch frame interval, such that a haptic feedback function is performed for an image displayed on a display panel.

Figure 13:
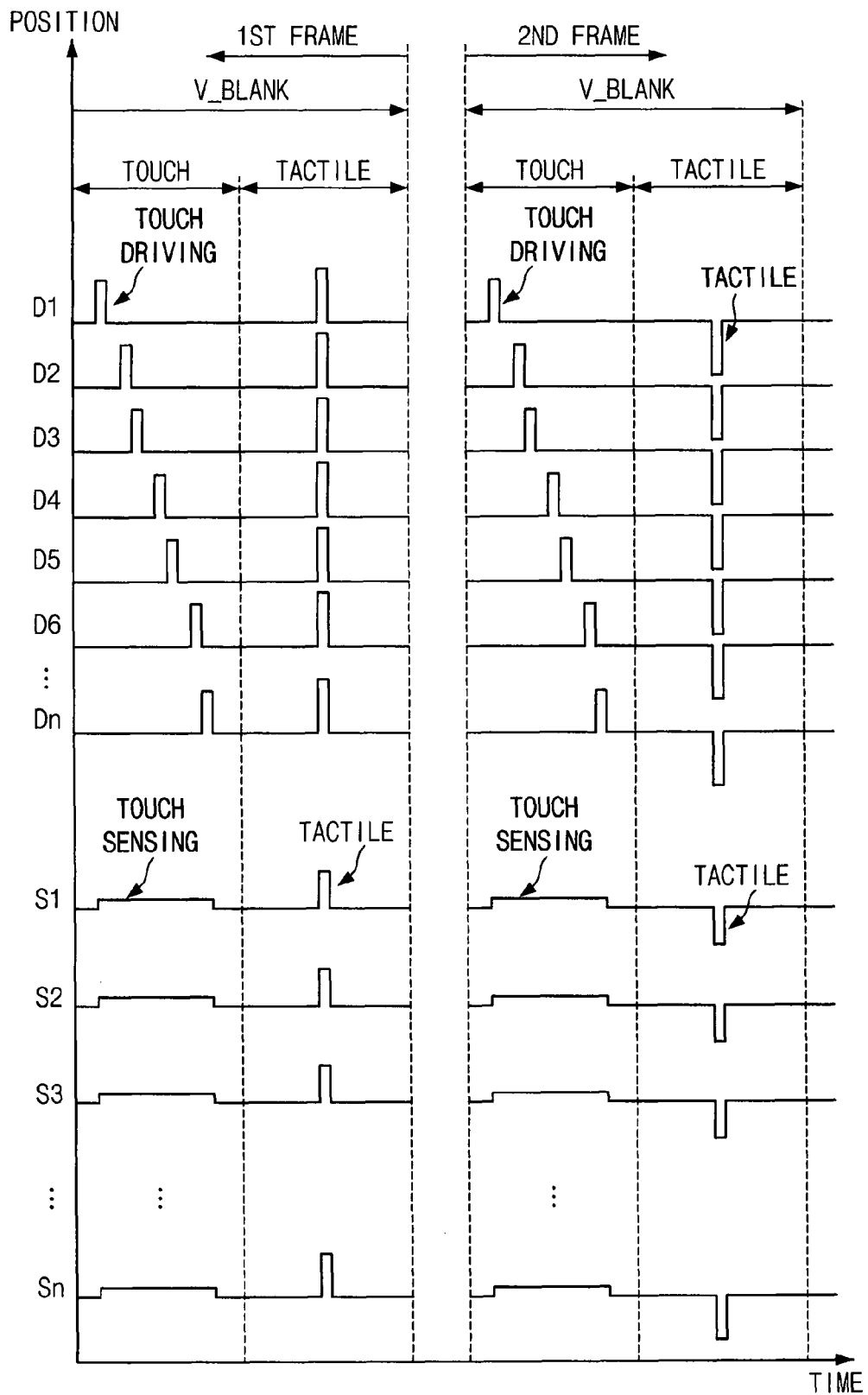
FIG. 13 is a signal timing diagram showing a transmitting/receiving timing of another alternative exemplary embodiment of a touch driving voltage, a touch sensing voltage and a tactile voltage in the touch screen apparatus described in FIG. 9.

FIG. 13 is a signal timing diagram showing a transmitting/receiving timing of another alternative exemplary embodiment of a touch driving voltage, a touch sensing voltage and a tactile voltage in the touch screen apparatus described in FIG. 9. As shown in FIG. 13, in an exemplary embodiment, the amplitudes of tactile voltages applied to the touch driving lines D1, D2, D3, . . . , Dn are greater than the amplitudes of touch driving voltages applied to the touch driving lines D1, D2, D3, . . . , Dn. In such an embodiment, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 9 and 13, an odd numbered vertical blanking interval, which follows an odd numbered vertical blanking interval when an image is not displayed on the display panel, includes a first touch interval and a first tactile interval, and an even numbered vertical blanking interval, which follows an even numbered frame when the an image is not displayed on the display panel, includes a second touch interval and a second tactile interval.

In the first touch interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, . . . , Sn are simultaneously collected by the sensing voltage collecting part 224.

In the first tactile interval, a first tactile voltage is simultaneously applied to each of the touch driving lines D1, D2, D3, . . . , Dn and the touch sensing lines S1, S2, S3, . . . , Sn.

In the second tactile interval, a touch driving voltage is outputted from the touch voltage applying part 222 and sequentially applied to each of the touch driving lines D1, D2, D3, . . . , Dn, and the touch sensing voltages corresponding to the touch sensing lines S1, S2, S3, ..., Sn are simultaneously collected by the sensing voltage collecting part 224.

In the third tactile interval, a second tactile voltage having an opposite to the first tactile voltage is simultaneously applied to each of the touch driving lines D1, D2, D3, ..., Dn and the touch sensing lines S1, S2, S3, ..., Sn.

In an exemplary embodiment, as shown in FIG. 13, a tactile voltage is simultaneously applied to all of the touch driving lines D1, D2, D3, ..., Dn and all of the touch sensing lines S1, S2, S3, ..., Sn. In an alternative exemplary embodiment, the tactile voltage may be locally applied in accordance with an area where a touch occurs.

In one exemplary embodiment, for example, when the sensing voltage collecting part 224 collects the touch sensing voltage, the timing control part 260 may determine that a touch occurs at a position. In such an embodiment, the timing control part 260 provides the tactile voltage applying part 226 with information for the position of the touch. The tactile voltage applying part 226 applies a tactile voltage to a touch driving line in a portion corresponding to the position of the touch and a touch sensing line in the portion corresponding to the position of the touch. In such an embodiment, the number of the touch driving lines in the portion corresponding to the position of the touch may be greater than two. In such an embodiment, the number of the touch sensing lines in the portion corresponding to the position of the touch may be greater than two.

As described above, in an exemplary embodiment, a first tactile voltage is simultaneously applied to the touch driving lines and the touch sensing lines in a first tactile interval of an odd numbered touch frame interval, and a second tactile voltage having a phase opposite to the first tactile voltage is applied to the touch driving lines and the touch sensing lines in a second tactile interval of an even numbered touch frame interval, such that a haptic feedback function is performed for an image displayed on a display panel.

Figure 14:
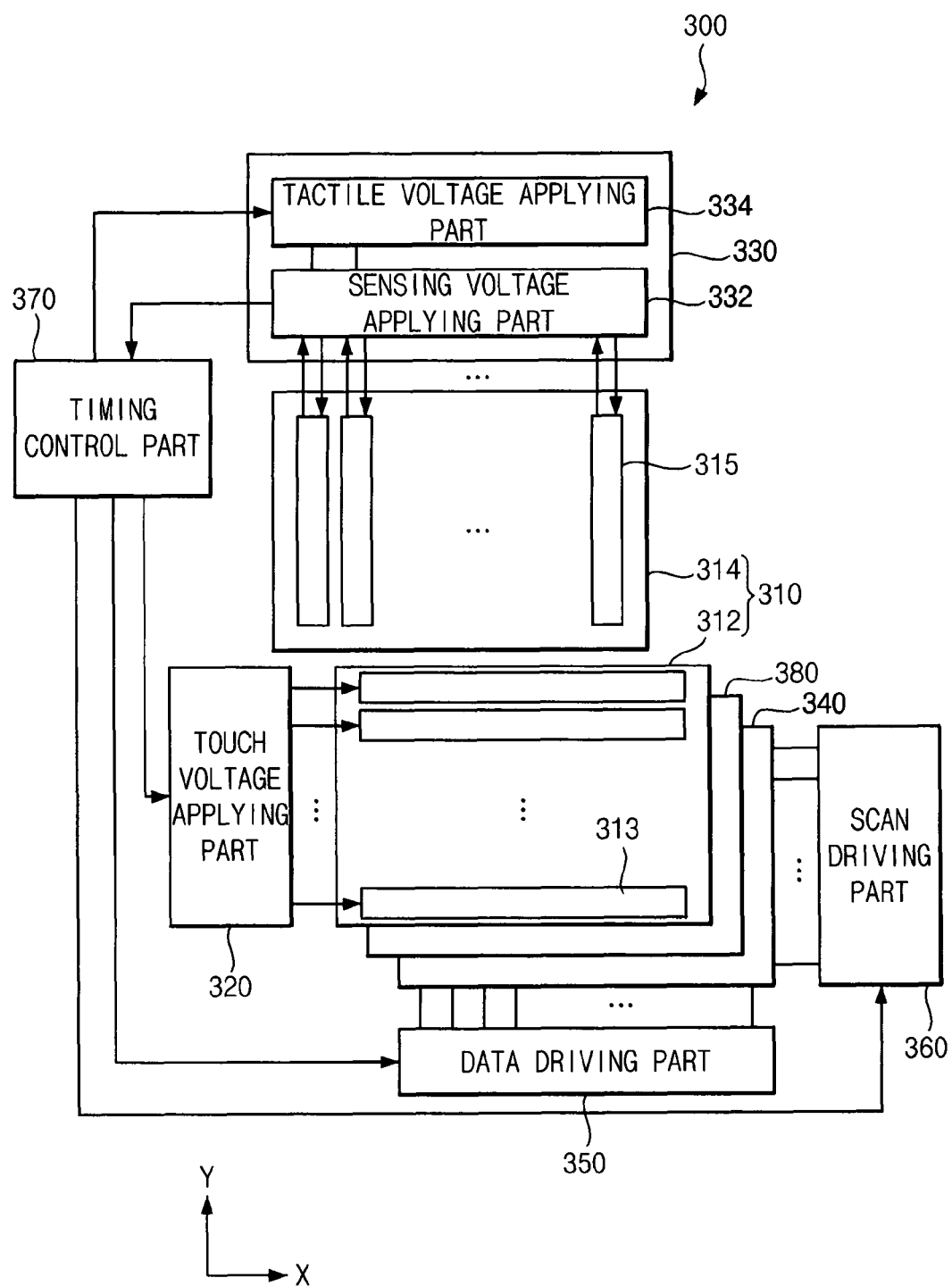
FIG. 14 is a block diagram showing another alternative exemplary embodiment of a touch screen apparatus according to the invention.

FIG. 14 is a block diagram showing another alternative exemplary embodiment of a touch screen apparatus according to the invention.

Referring to FIG. 14, an exemplary embodiment of a touch screen apparatus 300 according to the invention includes a tactile touch panel 310, a touch voltage applying part 320, a voltage transmitting/receiving part 330, a display panel 340, a data driving part 350, a scan driving part 360 and a timing control part 370.

The tactile touch panel 310 includes a first substrate 312 and a second substrate 314 disposed on the first substrate 312 to perform a touch function and a haptic feedback function.

A plurality of touch driving lines 313 is disposed on the first substrate 312. The touch driving lines 313 extend substantially parallel to X-axis and arranged in a Y-axis direction. The touch driving lines 313 may have an ITO pattern structure of a bar shape.

A plurality of touch sensing lines 315 is disposed on the second substrate 314. The touch sensing lines 315 extend substantially parallel to Y-axis and arranged in an X-axis direction. The touch sensing lines 315 may have an ITO pattern structure of a bar shape. When viewed from a plan view, the touch driving lines 313 and the touch sensing lines 315 may cross each other.

The touch voltage applying part 320 is connected to the touch driving lines 313 and applies a touch driving voltage to each of the touch driving lines 313.

The voltage transmitting/receiving part 330 includes a sensing voltage collecting part 332 and a tactile voltage applying part 334.

The touch sensing voltage collecting part 332 is connected to the touch sensing lines 315 and receives touch sensing voltages. The touch sensing voltage collecting part 332 provides the timing control part 370 with the received touch sensing voltages.

The tactile voltage applying part 334 is connected to the touch sensing lines 315 and applies a tactile voltage corresponding to an image displayed on the display panel 340 to the touch sensing lines 315 in a blanking interval when a touch driving voltage is not applied to the touch sensing lines 315. The tactile voltage may be a voltage greater than a touch driving voltage. In one exemplary embodiment, for example, when the image displayed on the display panel 340 is an image of uneven texture, the tactile voltage applying part 334 provides the touch sensing lines 315 with a tactile voltage having first amplitude.

The display panel 340 is disposed below the tactile touch panel 310. The display panel 340 is substantially the same as the display panel 130 described with reference to FIG. 2, and thus any repetitive detailed description thereof will hereinafter be omitted.

Each of the data driving part 350 and the scan driving part 360 is substantially the same as the data driving part 140 and the scan driving part 160 described with reference to FIG. 2, and thus any repetitive detailed description thereof will hereinafter be omitted.

The timing control part 370 provides the data driving part 350 with an image data for displaying an image on the display panel 340 and a first control signal corresponding to the image data, and provides the scan driving part 360 with a second control signal for activating a switching element disposed on the display panel 340. In such an embodiment, the timing control part 370 provides the touch voltage applying part 320 with a third control signal for performing a touch function, and receives a touch sensing voltage provided from the sensing voltage collecting part 332. In such an embodiment, the timing control part 370 provides the tactile voltage applying part 334 with a fourth control signal for performing a haptic feedback function.

In an exemplary embodiment, the touch screen apparatus 300 may further include a shielding layer 380. The shielding layer 380 is disposed between the tactile touch panel 310 and the display pane 340 and blocks the tactile voltage outputted from the tactile voltage applying part 334 from being applied to the display panel 340.

In an alternative exemplary embodiment, the shielding layer 380 may disposed within the display panel 340. In an exemplary embodiment, where the display panel 340 is a liquid crystal display panel including an array substrate, an opposite substrate opposite to the array substrate and a liquid crystal layer interposed between the array substrate and the opposite substrate, the shielding layer 380 may be disposed on the opposite substrate. In an alternative exemplary embodiment, the shielding layer 380 may be disposed on the array substrate.

Hereinafter, timings of exemplary embodiments of the touch driving voltage and a tactile voltage applied to the tactile touch panel 310 described in FIG. 13 will be described in detail. In the following signal timing diagrams, D1, D2, D3, ..., Dn denote touch driving lines, and S1, S2, S3, ..., Sn denote touch sensing lines, where n is a natural number.

Figure 15:
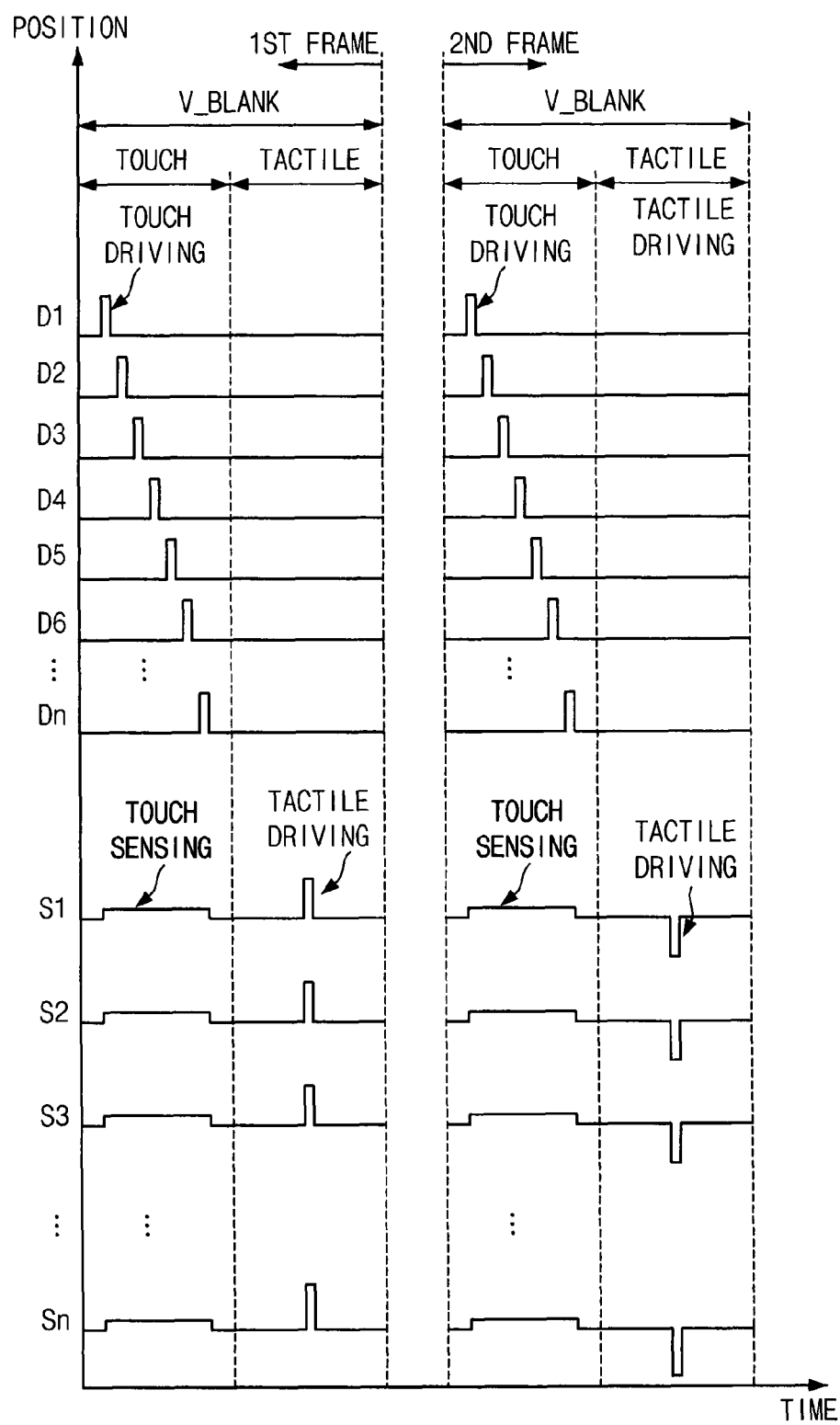
FIG. 15 is a signal timing diagram showing a transmitting/receiving timing of an exemplary embodiment of a touch driving voltage, a touch sensing voltage and a tactile voltage in the touch screen apparatus described in FIG. 14.

FIG. 15 is a signal timing diagram showing a transmitting/receiving timing of an exemplary embodiment of a touch driving voltage, a touch sensing voltage and a tactile voltage in the touch screen apparatus described in FIG. 14.

Referring to FIGS. 14 and 15, an odd-numbered vertical blanking interval, e.g., the vertical blanking interval (V_BLANK) of the first frame, when an image is not displayed on a display panel includes a first touch interval (TOUCH) and a first tactile interval (TACTILE), and an even-numbered vertical blanking interval, e.g., the vertical blanking interval (V_BLANK) of the second frame, when an image is not displayed on a display panel includes a second touch interval (TOUCH) and a second tactile interval (TACTILE).

In the first touch interval, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 224.

In the first tactile interval, a first tactile voltage is simultaneously applied to each of the touch sensing lines S1, S2, S3, . . . , Sn.

In the second tactile interval, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332.

In the second tactile interval, a second tactile voltage having an opposite to the first tactile voltage is simultaneously applied to each of the touch sensing lines S1, S2, S3, . . . , Sn.

In an exemplary embodiment, as shown in FIG. 15, a tactile voltage is applied to all of the touch sensing lines S1, S2, S3, . . . , Sn. In an alternative exemplary embodiment, the tactile voltage may be locally applied in accordance with an area where a touch occurs on the tactile touch panel 310.

As described above, in an exemplary embodiment, a first tactile voltage is applied to the touch sensing lines in a tactile interval of an odd-numbered vertical blanking interval, and a second tactile voltage having a phase opposite to the first tactile voltage is applied to the touch sensing lines in a tactile interval of an even-numbered vertical blanking interval, such that a haptic feedback function is performed for an image displayed on a display panel.

Figure 16:
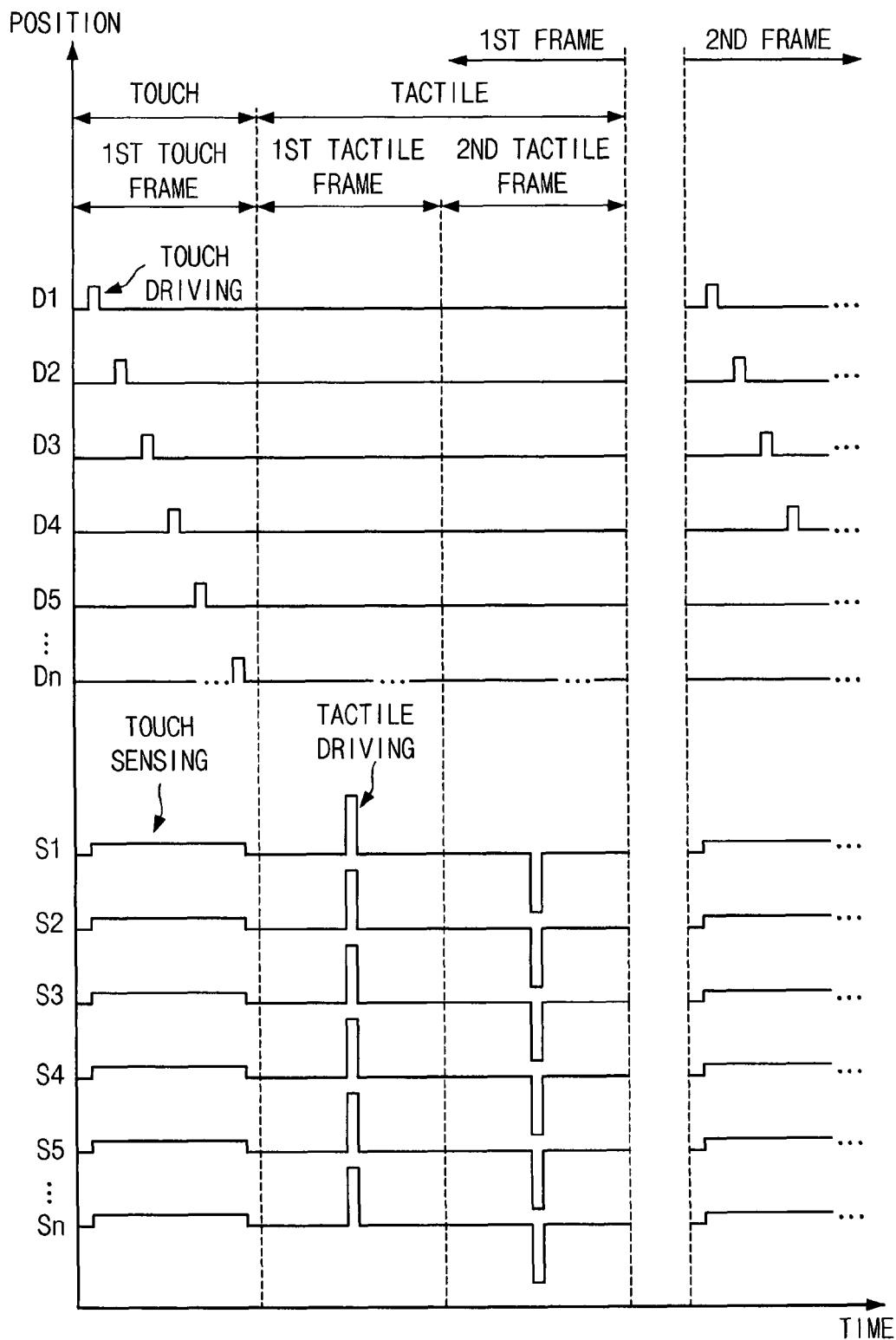
FIG. 16 is a signal timing diagram showing a transmitting/receiving timing of an alternative exemplary embodiment of a touch driving voltage, a touch sensing voltage and a tactile voltage in the touch screen apparatus described in FIG. 14.

FIG. 16 is a signal timing diagram showing a transmitting/receiving timing of an alternative exemplary embodiment of a touch driving voltage, a touch sensing voltage and a tactile voltage in the touch screen apparatus described in FIG. 14.

Referring to FIGS. 14 and 16, a vertical blanking interval, during which an image is not displayed on a display panel, includes a touch interval and a tactile interval. The tactile interval includes a first tactile frame interval and a second tactile frame interval.

In the touch interval, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332.

In the first tactile frame interval, a first tactile voltage is applied to each of the touch sensing lines S1, S2, S3, . . . , Sn.

In the second tactile frame interval, a second tactile voltage having a phase opposite to the first tactile voltage is applied to each of the touch sensing lines S1, S2, S3, . . . , Sn.

In an exemplary embodiment, as shown in FIG. 16, a tactile voltage is simultaneously applied to all of the touch sensing lines S1, S2, S3, . . . , Sn. In an alternative exemplary embodiment, the tactile voltage may be locally applied in accordance with an area where a touch occurs on the tactile touch panel 310.

Figure 17:
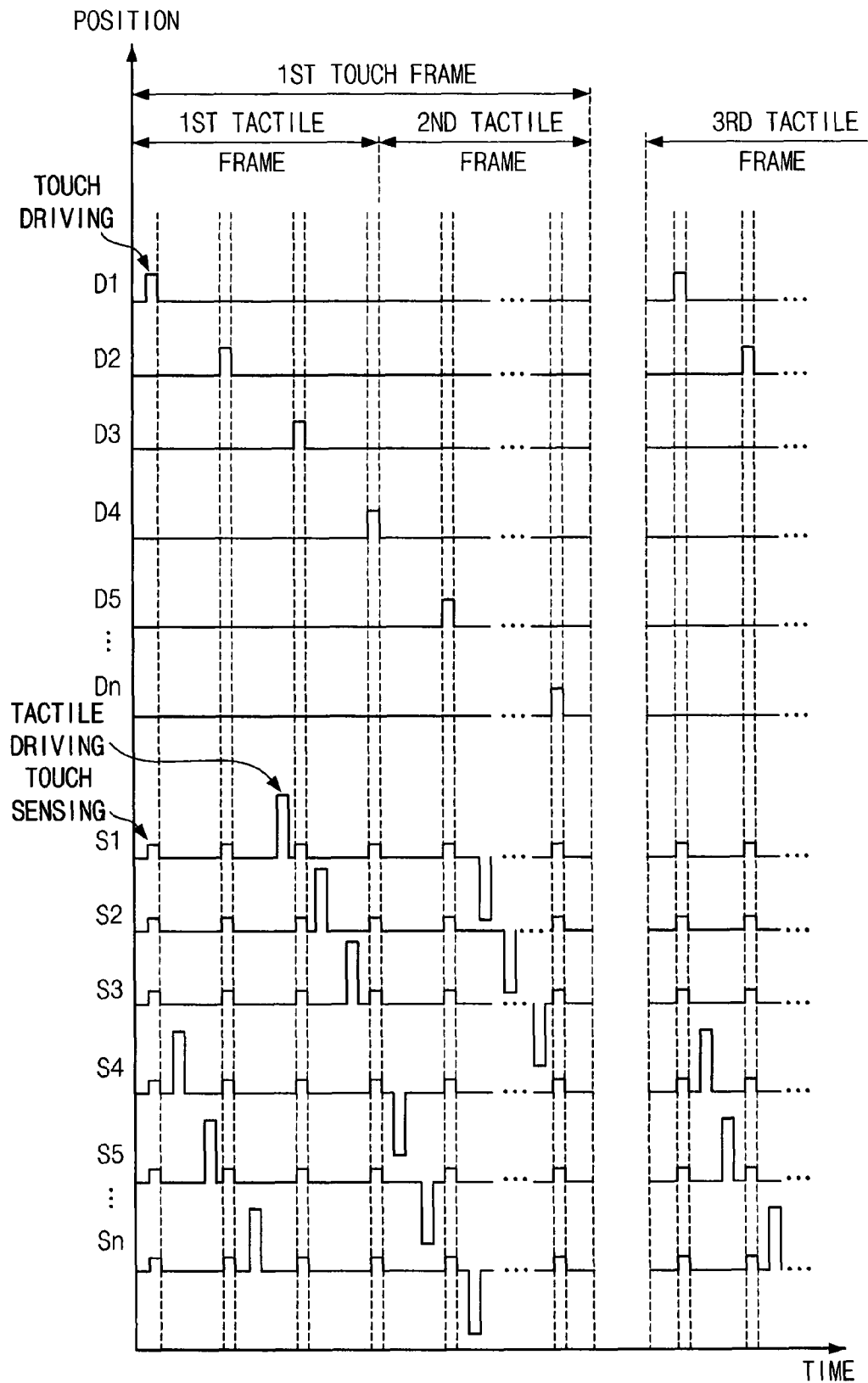
FIG. 17 is a signal timing diagram showing a transmitting/receiving timing of another alternative exemplary embodiment of a touch driving voltage, a touch sensing voltage and a tactile voltage in the touch screen apparatus described in FIG. 14.

FIG. 17 is a signal timing diagram showing a transmitting/receiving timing of an alternative exemplary embodiment of a touch driving voltage, a touch sensing voltage and a tactile voltage in the touch screen apparatus described in FIG. 14. In an exemplary embodiment, as shown in FIG. 17, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 14 and 17, one touch frame interval includes a first tactile frame interval and a second tactile frame interval.

In the touch frame interval, a touch driving voltage is outputted from the touch voltage applying part 320 and sequentially applied to each of the touch driving lines D1, D2, D3, . . . , Dn, and touch sensing voltages corresponding to the touch sensing lines S1, S2, S3, . . . , Sn are collected by the sensing voltage collecting part 332.

In the first tactile frame interval, a first tactile voltage is sequentially applied to each of the touch sensing lines S1, S2, S3, . . . , Sn, after the touch driving voltage is applied to the touch sensing lines S1, S2, S3, . . . , Sn.

In the second tactile frame interval, a second tactile voltage having a phase opposite to the first tactile voltage is applied to each of the touch sensing lines S1, S2, S3, . . . , Sn, before the touch driving voltage is applied to the touch sensing lines S1, S2, S3, . . . , Sn.

In an exemplary embodiment, as shown in FIG. 16, a tactile voltage is simultaneously applied to all of the touch sensing lines S1, S2, S3, . . . , Sn. In an alternative exemplary embodiment, the tactile voltage may be locally applied in accordance with an area where a touch occurs on a tactile touch panel 310.

In one exemplary embodiment, for example, when the sensing voltage collecting part 332 collects the touch sensing voltage, the timing control part 360 may determine that a touch occurs at a position. In such an embodiment, the timing control part 360 provides the tactile voltage applying part 334 with information for the position of the touch. The tactile voltage applying part 334 applies a tactile voltage to a touch sensing line in the portion corresponding to the position of the touch. In such an embodiment, the number of the touch sensing lines in the portion corresponding to the position of the touch may be greater than two.

As described above, in an exemplary embodiment, a first tactile voltage is applied to the touch sensing lines in a first tactile frame interval of one touch frame interval when a touch driving voltage is applied to the touch sensing lines, and a second tactile voltage having a phase opposite to the first tactile voltage is applied to the touch sensing lines in a second tactile frame interval of one touch frame interval, such that a haptic feedback function is performed for an image displayed on a display panel.

Figure 18:
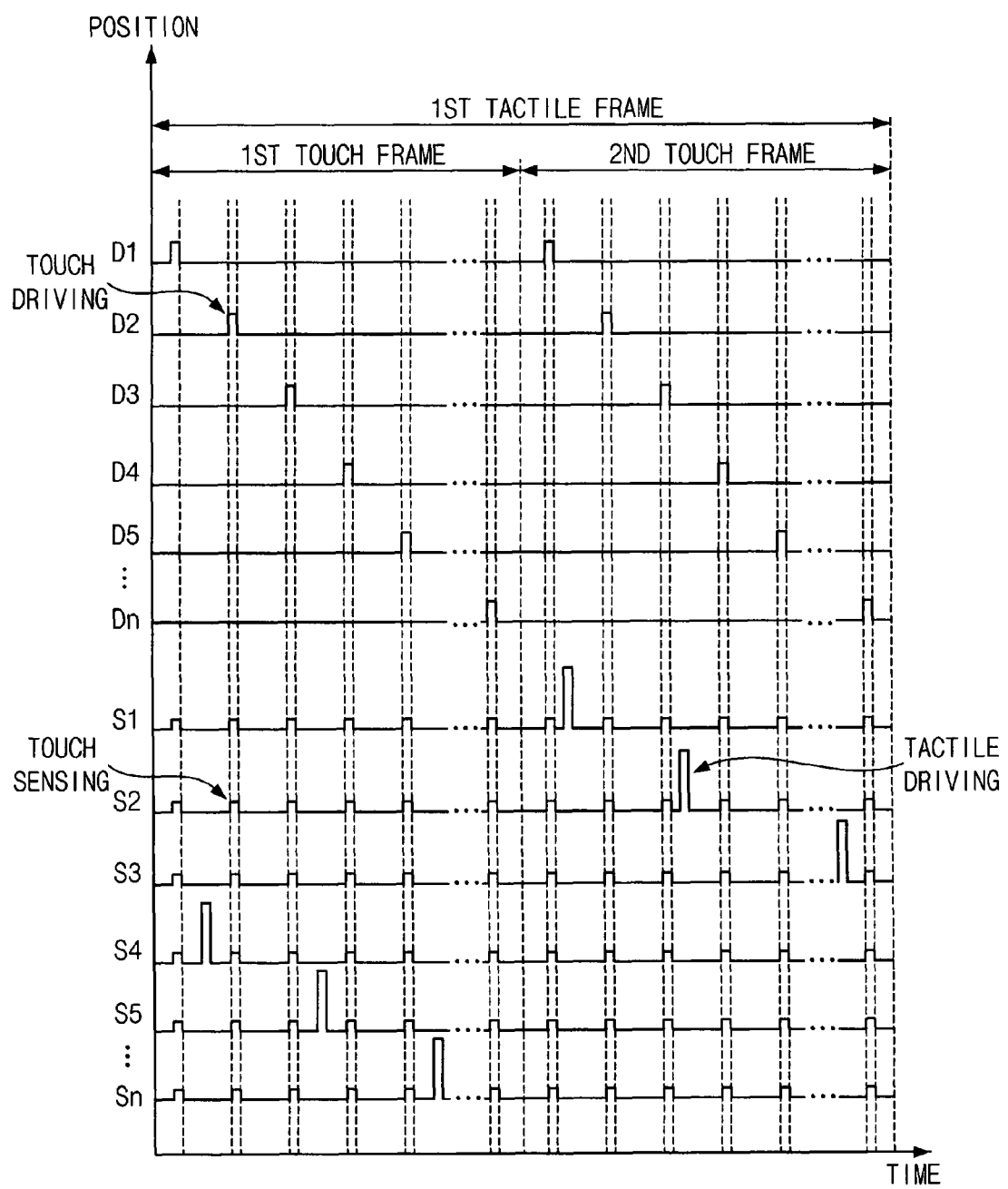
FIG. 18 is a signal timing diagram showing a transmitting/receiving timing of another alternative exemplary embodiment of a touch driving voltage, a touch sensing voltage and a tactile voltage in the touch screen apparatus described in FIG. 14.

FIG. 18 is a signal timing diagram showing a transmitting/receiving timing of another alternative exemplary embodiment of a touch driving voltage, a touch sensing voltage and a tactile voltage in the touch screen apparatus described in FIG. 14. In an exemplary embodiment, as shown in FIG. 18, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 14 and 18, two touch frame intervals may correspond to one tactile frame interval. A tactile voltage is applied to the touch driving lines D1, D2, D3, . . . , Dn before a touch driving voltage is applied to the touch driving lines D1, D2, D3, . . . , Dn in a first touch frame interval, and a tactile voltage is applied to the touch driving lines D1, D2, D3, . . . , Dn after a touch driving voltage is applied to the touch driving lines D1, D2, D3, . . . , Dn in a second touch frame interval.

In the first touch frame interval, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332. In such an embodiment, a tactile voltage is applied to the touch sensing lines S1, S2, S3, . . . , Sn before a touch driving voltage is applied thereto.

In the second touch frame interval, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332. In such an embodiment, a tactile voltage is applied to the touch sensing lines S1, S2, S3, . . . , Sn after a touch driving voltage is applied to touch sensing lines S1, S2, S3, . . . , Sn.

As described above, in an exemplary embodiment, one tactile frame interval is set to include two touch frame intervals, a tactile voltage is sequentially applied to the touch sensing lines before a touch driving voltage is applied to the touch sensing lines in a first touch frame interval, and a tactile voltage is sequentially applied to the touch sensing lines after a touch driving voltage is applied to the touch sensing lines in a second touch frame interval, such that a haptic feedback function is performed for an image displayed on a display panel.

Figure 19:
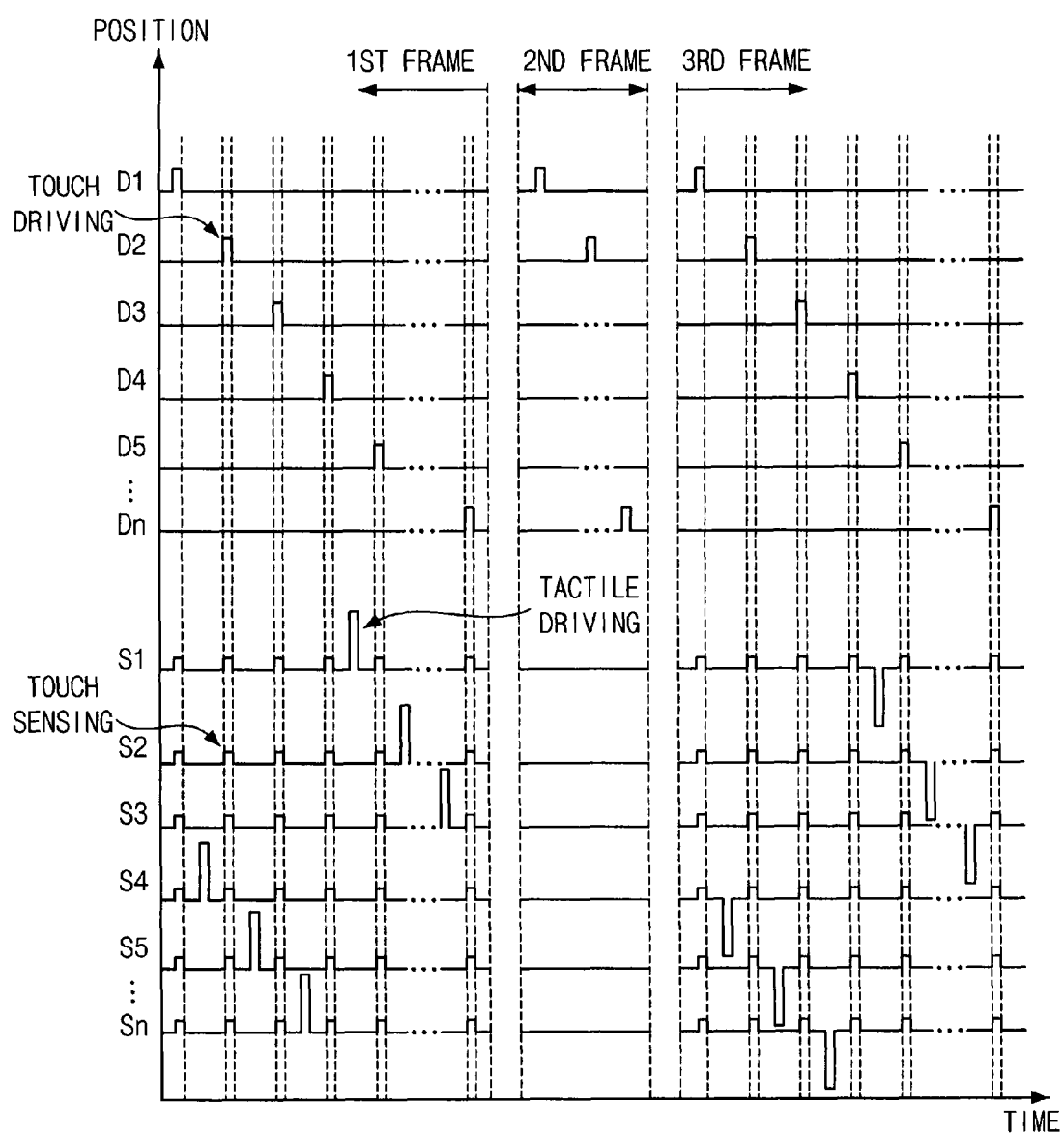
FIG. 19 is a signal timing diagram showing a transmitting/receiving timing of another alternative exemplary embodiment of a touch driving voltage, a touch sensing voltage and a tactile voltage in the touch screen apparatus described in FIG. 14.

FIG. 19 is a signal timing diagram showing a transmitting/receiving timing of another alternative exemplary embodiment of a touch driving voltage, a touch sensing voltage and a tactile voltage in the touch screen apparatus described in FIG. 14. In an exemplary embodiment, as shown in FIG. 19, the amplitudes of touch sensing voltages applied to the touch sensing lines S1, S2, S3, . . . , Sn are less than the amplitudes of tactile voltages applied to the touch sensing lines S1, S2, S3, . . . , Sn.

Referring to FIGS. 14 and 19, in a (4N-3)-th touch frame interval (here, 'N' is a natural number), e.g., a touch frame interval in the first frame, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332. In such an embodiment, a first tactile voltage is sequentially applied to the touch sensing lines S1, S2, S3, . . . , Sn in another time different from a time when a touch sensing voltage is sensed from each of the touch sensing lines S1, S2, S3, . . . , Sn.

In a (4N-2)-th touch frame interval, e.g., a touch frame interval in the second frame, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332. In such an embodiment, the first tactile voltage is not applied to the touch driving lines D1, D2, D3, . . . , Dn and the touch sensing lines S1, S2, S3, . . . , Sn.

In a (4N-1)-th touch frame interval, e.g., a touch frame interval in the third frame, a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332. In such an embodiment, a second tactile voltage having a phase opposite to the first tactile voltage is sequentially applied to the touch sensing lines S1, S2, S3, . . . , Sn in another time different from a time when a touch sensing voltage is sensed from each of the touch sensing lines S1, S2, S3, . . . , Sn.

In a (4N)-th touch frame interval, e.g., a touch frame interval in a fourth frame (not shown in FIG. 19), a touch driving voltage is outputted from the touch voltage applying part 320 and sequentially applied to each of the touch driving lines D1, D2, D3, . . . , Dn, and the touch sensing voltages corresponding to the touch sensing lines S1, S2, S3, . . . , Sn are collected by the sensing voltage collecting part 332. In such an embodiment, a second tactile voltage is not applied to the touch driving lines D1, D2, D3, . . . , Dn and the touch sensing lines S1, S2, S3, . . . , Sn.

In an exemplary embodiment, as shown in FIG. 19, a first tactile voltage and a second tactile voltage are simultaneously applied to all of the touch sensing lines S1, S2, S3, . . . , Sn, in an (4N-3)-th touch frame interval and an (4N-1)-th touch frame interval. In an alternative exemplary embodiment, the first tactile voltage and the second tactile voltage may be locally applied to the touch sensing lines S1, S2, S3, . . . , Sn.

As described above, in an exemplary embodiment, tactile voltages are not applied to the touch driving lines and the touch sensing lines in second and fourth touch frame intervals, and tactile voltages are sequentially applied to the touch driving lines and the touch sensing lines in first and third touch frame intervals, such that a haptic feedback function is performed for an image displayed on a display panel.

As described above, in an exemplary embodiment, a vertical blanking interval, during which an image is not displayed on a display panel, includes a touch interval and a tactile interval. Tactile voltages are sequentially applied to the touch sensing lines in the tactile interval, such that a haptic feedback function is performed for an image displayed on a display panel.

As described above, in an exemplary embodiment, a vertical blanking interval, during which an image is not displayed on the display panel, includes a touch interval, a first tactile frame interval and a second tactile frame interval. Tactile voltages having a phase opposite to each other are simultaneously applied to the touch sensing lines in the first tactile frame interval and the second tactile frame interval, such that a haptic feedback function is performed for an image displayed on a display panel.

As described above, in an exemplary embodiment according to the invention, in a blanking interval when a touch driving voltage is not applied, a tactile voltage corresponding to a displayed image to a tactile touch panel to perform a haptic feedback function on a touch screen apparatus of a capacitance type, such that a touch operation is effectively prevented from being blocked by an electric field generated by a tactile image.

In an exemplary embodiment, a haptic feedback function is performed by a touch screen apparatus, and thickness or weight of a touch screen apparatus are substantially reduced.

In an exemplary embodiment, a touch panel of a capacitance type, which has touch driving lines and touch sensing lines, operates as a tactile touch panel representing a tactile image, such that a tactile panel for a haptic feedback may be omitted, and a light transmissivity of a touch screen apparatus is thereby substantially improved.

Having described exemplary embodiments of the invention, it is further noted that it is readily apparent to those of reasonable skill in the art that various modifications may be made without departing from the spirit and scope of the invention which is defined by the metes and bounds of the appended claims.

What is claimed is:

1. A touch screen apparatus comprising:
   a tactile touch panel comprising a plurality of touch driving lines and a plurality of touch sensing lines, wherein the tactile touch panel performs a touch function and a haptic feedback function;
   a touch voltage applying part which applies a touch driving voltage to the tactile touch panel; and
   a tactile voltage applying part which applies a tactile voltage corresponding to an image to be displayed on the tactile touch panel to the touch driving lines of the tactile touch panel in a blanking interval, during which the touch driving voltage is not applied, after a touch on the tactile touch panel is detected based on a touch sensing signal received through the touch sensing lines,
   wherein a touch frame interval, in which the touch driving voltage is sequentially applied to touch driving lines where a touch has been detected prior to said blanking interval, includes a first tactile frame interval and a second tactile frame interval,
   wherein during the first tactile frame interval, the tactile voltage applying part sequentially applies a first tactile voltage to each of said touch driving lines where a touch has been detected prior to said blanking interval, and
   during the second tactile frame interval, the tactile voltage applying part applies a second tactile voltage having a phase opposite to the first tactile voltage to each of said touch driving lines where a touch has been detected prior to said blanking interval.

2. The touch screen apparatus of claim 1, wherein the touch driving lines and the touch sensing lines are disposed on a same substrate.

3. The touch screen apparatus of claim 2, wherein the touch driving lines and the touch sensing lines extend crossing each other,
   the tactile touch panel further comprises an insulation layer disposed on an area where the touch driving lines and the touch sensing lines overlap each other, wherein the insulation layer electrically isolates the touch driving lines and the touch sensing lines.

4. The touch screen apparatus of claim 2, wherein the touch driving lines and the touch sensing lines are substantially parallel to each other.

5. The touch screen apparatus of claim 2, wherein the tactile voltage applying part applies the tactile voltage to the touch driving lines and the touch sensing lines.

6. The touch screen apparatus of claim 1, wherein the touch driving lines and the touch sensing lines are disposed on different substrates, respectively.

7. The touch screen apparatus of claim 6, wherein the tactile voltage applying part applies the tactile voltage to the touch sensing lines.

8. The touch screen apparatus of claim 1, wherein a phase of the tactile voltage applied to the tactile display panel is inverted every frame interval of the image to be displayed thereon.

9. The touch screen apparatus of claim 1, wherein the tactile voltage is applied to a portion of the tactile touch panel corresponding to a position of the touch detected through the touch sensing lines.

10. The touch screen apparatus of claim 1, further comprising:
    a display panel disposed below the tactile touch panel; and
    a shielding layer disposed between the tactile touch panel and the display panel and which blocks the tactile voltage from being applied to the display panel.

11. The touch screen apparatus of claim 10, further comprising:
    a scan driving part which outputs a scan signal which activates a switching element disposed on the display panel,
    wherein the tactile voltage applying part applies the tactile voltage to the touch driving lines and the touch sensing lines in a vertical blanking interval during which the scan signal is not applied to the display panel.

12. The touch screen apparatus of claim 1, wherein the blanking interval is in a vertical blanking interval of the image.

13. The touch screen apparatus of claim 1, wherein
    the touch voltage applying part applies a single touch driving voltage to the tactile touch panel in a vertical blanking interval of the image, and
    the tactile voltage applying part applies a single tactile voltage to the tactile touch panel in the vertical blanking interval of the image.

14. The touch screen apparatus of claim 1, wherein
    the touch driving voltage is applied to the touch driving lines in a touch frame interval,
    the tactile voltage is applied to the tactile touch panel in a tactile frame interval,
    two touch frame intervals correspond to one tactile frame interval,
    the tactile voltage applying part applies a first tactile voltage to the tactile touch panel before the touch driving voltage is applied to the touch driving lines in a first touch frame interval of the two touch frame intervals, and applies a second tactile voltage to the tactile touch panel after the touch driving voltage is applied to the touch driving lines in the second touch frame interval of the two touch frame intervals.

15. The touch screen apparatus of claim 1, wherein
    the tactile voltage applying part applies the first tactile voltage to the tactile touch panel during the blanking period in a (4N-3)-th touch frame interval, and applies the second tactile voltage to the tactile touch panel during the blanking period in a (4N-1)-th touch frame interval, and
    N is a natural number.

16. The touch screen apparatus of claim 1, wherein
    a vertical blanking interval of the image includes a touch interval and a tactile interval,
    the touch voltage applying part applies the touch driving voltage to the tactile touch panel in the touch interval, and the tactile voltage applying part applies the tactile voltage to the tactile touch panel in the tactile interval.

17. The touch screen apparatus of claim 1, wherein
a vertical blanking interval of the image includes a touch interval and a tactile interval,
the tactile interval includes a first tactile frame interval and a second tactile interval,
the touch voltage applying part applies the touch driving voltage to the tactile touch panel in the touch interval, and
the tactile voltage applying part applies a first tactile voltage to the tactile touch panel in the first tactile frame interval, and applies a second tactile voltage having a phase opposite to the first tactile voltage to the tactile touch panel in the second tactile frame interval.

* * * * *